(12) United States Patent  (10) Patent No.: US 8,879,588 B2
Radic  (45) Date of Patent: Nov. 4, 2014

(54) METHOD AND DEVICE FOR FAST TUNING OF OPTICAL SOURCES

(75) Inventor: Stojan Radic, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 100 days.

(21) Appl. No.: 13/806,096

(22) PCT Filed: Jun. 30, 2011

(86) PCT No.: PCT/US2011/042699
§ 371 (c)(1),
(2), (4) Date: May 8, 2013

(87) PCT Pub. No.: WO2012/003391
PCT Pub. Date: Jan. 5, 2012

(65) Prior Publication Data
US 2013/0223459 A1  Aug. 29, 2013

Related U.S. Application Data

(60) Provisional application No. 61/360,325, filed on Jun. 30, 2010.

(51) Int. Cl.
*H01S 3/10* (2006.01)
*G02F 1/39* (2006.01)
*G02F 1/35* (2006.01)
*H01S 3/13* (2006.01)
*H01S 3/23* (2006.01)
*H01S 3/00* (2006.01)

(52) U.S. Cl.
CPC . *H01S 3/13* (2013.01); *G02F 1/395* (2013.01); *H01S 3/2383* (2013.01); *G02F 1/3534* (2013.01); *H01S 3/0092* (2013.01)
USPC ............ 372/20; 372/21; 372/22; 372/23; 372/29.02; 372/32

(58) Field of Classification Search
USPC .............................. 372/20, 21, 23, 32, 29.02
See application file for complete search history.

(56) References Cited

U.S. PATENT DOCUMENTS

| 5,912,910 | A  | * | 6/1999 | Sanders et al. | 372/22 |
|---|---|---|---|---|---|
| 7,630,418 | B2 | * | 12/2009 | Franjic et al. | 372/21 |
| 8,599,889 | B2 | * | 12/2013 | Biegert et al. | 372/25 |
| 2009/0180498 | A1 | * | 7/2009 | Schmidt | 372/21 |
| 2012/0292531 | A1 | * | 11/2012 | Grudinin et al. | 250/459.1 |

* cited by examiner

*Primary Examiner* — Kinam Park
(74) *Attorney, Agent, or Firm* — Eleanor M. Musick; Procopio, Cory, Hargreaves & Savitch LLP

(57) ABSTRACT

A method and device are provided for fast, continuous tuning of an optical source. A first pump signal with a first pump frequency is input into a mixer along with a first seed signal having a first seed frequency. Within the mixer, the first pump signal and the first seed signal generate at least one idler having an idler frequency defined as two times the pump frequency minus the seed frequency. Shifting the pump signal across a frequency range at a sweep rate causes the idler frequency to be shifted by two times the frequency range at two times the sweep rate. The shifted at least one idler is mixed with the shifted pump signal to generate a first mix product that has two times the sweep rate and frequency range of the pump signal.

44 Claims, 25 Drawing Sheets

| Pass N \ Harmonic M | 0 | 1 | 2 | 3 | 4 | 5 | 6 | 7 |
|---|---|---|---|---|---|---|---|---|
| 0 | 0 | - | - | - | - | - | - | - |
| 1 | 1 | 1 | - | - | - | - | - | - |
| 2 | 2 | 3 | 3 | - | - | - | - | - |
| 3 | 3 | 5 | 6 | 6 | - | - | - | - |
| 4 | 4 | 7 | 9 | 10 | 10 | - | - | - |
| 5 | 5 | 9 | 12 | 14 | 15 | 15 | - | - |
| 6 | 6 | 11 | 15 | 18 | 20 | 21 | 21 | - |
| 7 | 7 | 13 | 18 | 22 | 25 | 27 | 28 | 28 |

FIG. 23

METHOD AND DEVICE FOR FAST TUNING OF OPTICAL SOURCES

RELATED APPLICATIONS

The present application claims the benefit of the priority of application No. 61/360,325, filed Jun. 30, 2010, which is incorporated herein by reference in its entirety.

FIELD OF THE INVENTION

The present invention relates to fast, wide-band laser sources for spectroscopy, sensing and tomography applications and methods of construction thereof.

BACKGROUND OF THE INVENTION

A need for very fast, continuously tunable sources over wide spectral range has been recognized in sensing and process control applications. As an illustration of a technical challenge, consider cycle-resolved, MHz-scale resolution of combustion process in a modern jet engine that operates at or above 100,000 rpm, generating spectral signatures over hundreds of nanometers across the optical (infrared) range. While the capture of the entire spectral content might be demanding, even a partial, 100 nm-wide acquisition requires a MHz-linewidth source capable of ~106 nm/s tuning (sweep) rate. Similar challenge is posed by the use of tunable source for biomedical imaging purposes. A video-rate optical coherence tomography (OCT) with sub-micron resolution would dictate ~109 nm/s sweep rate over spectral range measured in hundreds of nanometers, which is currently out of reach of conventional tunable laser physics. Continuously tunable oscillator devices have been introduced both in RF and optical domains and rely on diverse technologies.

A combination of fundamental and practical barriers sets strict limits on laser tuning performance. An ideal tunable source should possess unlimited tuning speed, be capable of sweeping over arbitrarily wide band while attaining narrow line-width. Unfortunately, the existence of such source is prohibited by the Heisenberg principle, as its operation would imply that the strict spectral localization, inferred by narrow linewidth, is possible in spite of arbitrarily fast tuning speed and range. In a limit, an infinite sweep rate would imply that the source frequency can be anywhere within the tuning range while the near-zero linewidth would guarantee exact spectral localization.

Long before reaching the uncertainty limit, fundamental laser physics would have barred one from constructing fast and coherent tunable source. All known tunable technologies rely on cavity reconfiguration to achieve wavelength tuning, in which the cavity length is varied to enforce the new resonant frequency. Even though the cavity can be reconfigured swiftly, either via mechanical, optical or electrical means, the linewidth is invariably sacrificed since the coherence of the laser wave depends on the photon cavity lifetime. Indeed, in order to tune to the new wavelength, one has to wait longer than the photon cavity lifetime. Worse, the photon lifetime is inversely proportional to the source linewidth: a narrower linewidth implies longer cavity reconfiguration time, implying that highly resonant cavities are not amenable to swift reconfiguration. The latter fact represents the true limit of the tunable technology that cannot be circumvented, even in principle, by any cavity engineering techniques. Consequently, the tunable source can be engineered for either tuning speed or narrow linewidth, but not for both simultaneously.

Continuously tunable, single wavelength sources are typically constructed by rapid reconfiguration of optical cavity and appear in multiple forms that include mechanical, electrical and all-optical techniques. An ideal tunable source has large tuning speed ($\Delta\lambda/\Delta t$), wide spectral range ($\alpha\lambda$) and narrow spectral width ($\delta\lambda$). A general figure of merit (M) quantifies the laser agility and is defined as a product of the tuning range, the tuning speed and the inverse of the source linewidth:

$$M = \Delta\lambda \times \frac{\Delta\lambda}{\Delta t} \times \delta\lambda^{-1}. \tag{1}$$

The construction of rapidly tunable, arbitrarily narrow linewidth source is both fundamental and practical challenge. To illustrate this, consider the rapid tuning requirements: the tunable cavity reconfiguration (and stabilization) time needs to be comparable to the photon roundtrip time; a narrow source linewidth ($\delta\lambda$) necessarily implies a long roundtrip time, in direct contradiction to the requirement for fast cavity changes. In practical terms, fast, repeatable cavity reconfiguration poses significant engineering challenge over wide spectral ranges.

SUMMARY OF THE INVENTION

The present invention improves the performance of agile sources by extra-cavity engineering. Rather than constructing an incrementally faster cavity, the inventive cavity-decoupled mechanism is a) not tied to cavity-defined time scales and b) is invariant of the source tuning technique. The present invention is applicable to optical coherence tomography (OCT) as well as to devices in general spectroscopy, remote sensing and metrology.

The invention is based on the principle of cavitless (cavity-less) source tuning ("CAST"), in which the frequency displacement of mixing tones leads to twice the frequency shift of the mixing product. The idler produced by four-wave mixing of a pump and seed has a frequency defined by conservation of energy, which results in the idler having twice the sweep range and rate of the pump. The resultant mixing product has an upscaled laser sweep corresponding to a 50% or better enhancement in the figure-of-merit (FOM).

In one embodiment, the FOM of a one pump mixer can be further enhanced by using higher-order or cascaded generation to generate multiple idler waves. An $n^{th}$-order idler can attain a sweep range and rate of (n+1) times the original (pump) tunable laser.

In another embodiment, separate mixer stages can be introduced to create only first-order idlers, with the idler of a first stage, with twice the sweep range and rate, being used to pump the second stage, doubling its pump, and so on up to n stages, resulting in $2^n$ times sweep upscaling.

In one aspect of the invention, a method is provided for tuning an optical source in which a first pump signal having a first pump frequency is input into a mixer along with a first seed signal having a first seed frequency. Within the mixer, the first pump signal and the first seed signal generate at least one idler having an idler frequency defined as two times the pump frequency minus the seed frequency. Shifting the pump signal across a frequency range at a sweep rate causes the idler frequency to be shifted by two times the frequency range at two times the sweep rate. The shifted at least one idler is mixed with the shifted pump signal to generate at a mixer output a first mix product having two times the sweep rate and frequency range of the pump signal. In one embodiment, the first mix product is input into a second mixer stage having a second seed signal, whereby a second mix product of the second mixer stage has a sweep rate and a frequency range that is doubled relative to the first mix product. In another embodiment, the second mix product is input into n additional stages, whereby an $n^{th}$ mix product is generated having a sweep rate and a frequency range that are scaled up to (n+1) times the pump signal. In still another embodiment, the pump signal has a pump power having a level adapted to cause the at least one idler to act as a secondary pump source, whereby the first mix product is scaled up to three times the sweep rate and frequency range of the pump signal.

In another aspect of the invention, a method is provide for upscaling a sweep rate and frequency range of an optical source by, within a first mixer, using four-photon mixing to generate at least one idler from a combination of a first pump signal from the optical source having a pump frequency and a pump sweep rate and a seed signal, wherein the at least one idler has an idler frequency range and idler sweep rate that is twice the pump frequency range and pump sweep rate, and mixing the at least one idler with the pump signal to generate a first mix product at an output, the first mix product having a sweep rate and frequency range that is at least twice that of the pump signal. In one embodiment, at least one additional mixer is cascaded with the first mixer so that the sweep rate and the frequency range of the mix product of the at least one additional mixer are upscaled by a factor of two relative to the first mix product. In another embodiment, a second pump signal having a second pump frequency is input into the first mixer, causing three new idlers having three different idler frequencies to be generated so that the first mix product has a sweep rate and frequency range that are four times that of the pump signal. In yet another embodiment, the first mix product is input into a second mixer stage having a second seed signal cause a second mix product of the second mixer stage to have a sweep rate and a frequency range that are doubled relative to the first mix product. The second mix product may be input into n additional stages to generate an $n^{th}$ mix product having a sweep rate and a frequency range that are scaled up to (n+1) times the pump signal.

In yet another aspect of the invention, a fast, continuously tunable optical source includes a mixer having an input and an output, a first pump adapted for generating a pump signal at a first pump frequency and for sweeping the frequency across a first frequency range, a first seed source for generating a first seed signal having a first seed frequency, a combiner for combining the first pump signal and the first seed signal and inputting the combined signals into the mixer, wherein the first pump signal and the first seed signal are mixed within the mixer to generate at least one idler having an idler frequency defined as two times the pump frequency minus the seed frequency, and wherein the at least one idler mixes with the pump signal to generate a first mix product at the output, the first mix product having two times the sweep rate and frequency range of the pump signal.

BRIEF DESCRIPTION OF THE DRAWINGS

FIG. 1b shows how the pump being shifted by $\Delta\omega$ results in a $2\Delta\omega$ idler shift.

FIG. 2a shows higher-order mixing and FIG. 2b shows cascaded mixing.

FIG. 3a shows three new idler frequencies; FIG. 3b shows the seed tone frequency shift being quadrupled; and FIG. 3c shows a total frequency shift of $5\Delta\omega$.

FIG. 23 is a table showing the harmonic frequency deviation from equidistant comb frequency in terms of SSB perturbation frequency ($\delta f$) with increased loop passes (N).

DETAILED DESCRIPTION

The conventional tunable design compromises either the tuning speed or the spectral resolution; this fundamental limitation can be circumvented by introducing a broadband, traveling-wave parametric process that does not require any resonant structure. This process is based on the cavitless source tuning (CAST) principle.

Figure 1B:
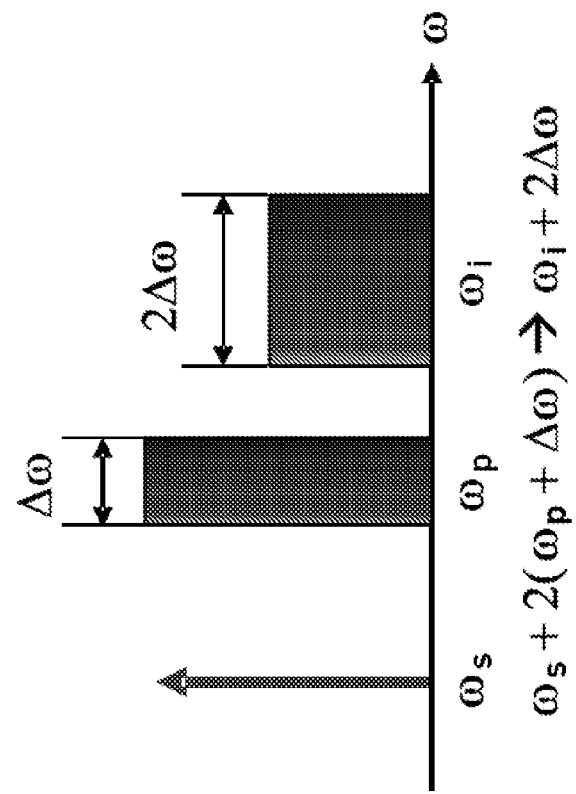
FIGS. 1a and 1b are diagrammatic illustrations of four wave mixing between the pump $\omega_p$ and a seed $\omega_s$, which results in generation of an idler (FIG. 1a)
Figure 1A:
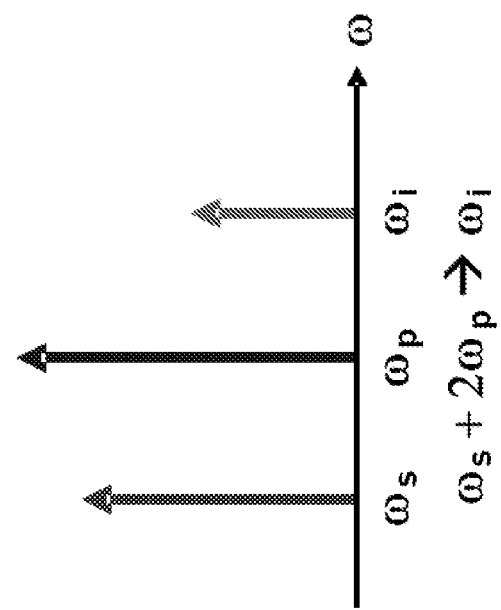

The CAST principle rests on early observation by Inoue and Toba ("Wavelength conversion experiment using fiber four-wave mixing," *IEEE Photon. Technol. Lett.* 4, 69-72 (1992)) that the frequency displacement of mixing tones leads to twice the frequency shift of the mixing product. This principle can be visualized in case of one-pump parametric mixer, illustrated in FIGS. 1a and 1b. In static regime, pump photons at frequency $\omega_p$ co-propagating with seed photons at $\omega_s$ results in generation of idler photons at $\omega_i$ due to four photon mixing (FPM) (FIG. 1a). The idler and signal photons are created via annihilation of two pump photons, with idler frequency strictly defined by the conservation of energy as $\omega_i = 2\omega_p - \omega_s$ (FIG. 1b). In silica, since the photon energy from near-infrared lasers are orders of magnitude below the material band-gap, the response time of electron-mediated FPM process is nearly instantaneous (~10 fs), and much faster than any time scale associated with conventional wavelength tuning. If the pump frequency is shifted by $\delta\omega_p$, the idler frequency will shifted instantly by $2\Delta\omega_p$. Consequently the frequency sweep rate ($d\omega/dt$) and range ($\Delta\omega$) are up-scaled simultaneously doubled. More importantly, since the energy of generated idler photons is strictly bound to the conservation of energy stated above, the uncertainty in idler photon energy, and thereby the idler line-width, will only be scaled by the same factor. Quantitatively, we may express the enhancement in a laser sweep in terms of a figure-of-merit (FOM), defined by the total sweep range ($\Delta\omega$), time lapse for a sweep ($\Delta\tau$) and the maximum linewidth ($\delta\omega$) of the sweep as:

$$FOM = \frac{\Delta\omega}{\Delta\tau \, \delta\omega} \quad (1)$$

Therefore the CAST scheme, even in its simplest form, provides a 50% enhancement in FOM.

The inventive technique is nearly invariant of the source original tuning speed since the parametric response is near instantaneous (subpicosecond) in nature. More importantly, while the uncertainty principle ties the laser linewidth and the cavity reconfiguration time, the subsequent parametric process does not fall under similar limitations since it represents an independent process, decoupled from the original lasing mechanism.

Figure 2A:
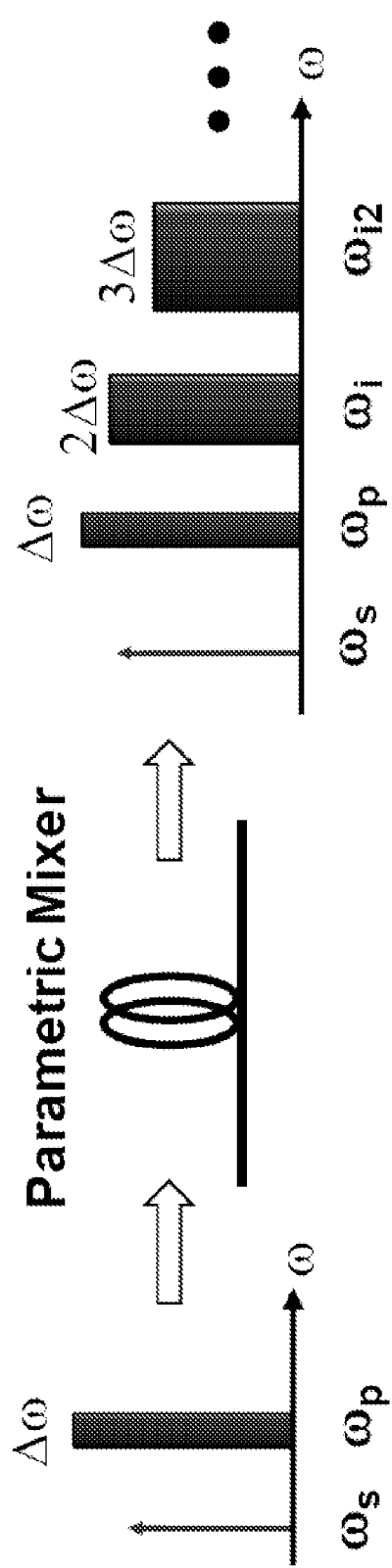
FIGS. 2a and 2b are diagrammatic examples of enhancement two-pump parametric devices, where
Figure 2B:
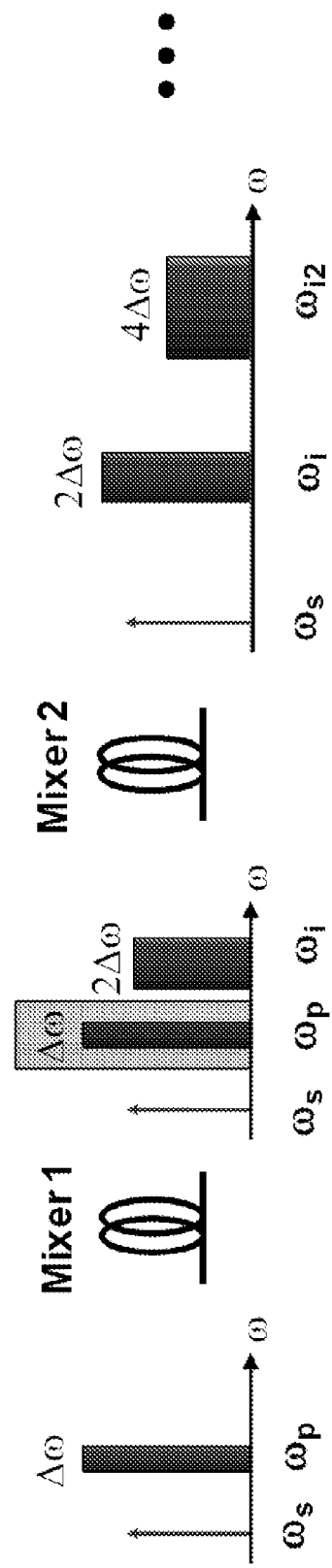

The sweep up-scaling factor, and thus FOM, can be further enhanced by relying on higher-order or cascaded generation, as shown in FIGS. 2a and 2b. Higher order generation can be achieved by launching higher power pump and seed into the mixer: the idler will eventually be powerful enough to act as a secondary pump source and will mix with spectrally-adjacent wave (primary pump in this case). As shown in FIG. 2a, since the idler contains twice the sweep range and rate of the pump, the resultant mixing product (second-order idler) will acquire an up-scaling factor of 3:

$$\omega_{i2} = 2(w_i + 2\Delta\omega_p) - (\omega_p + \Delta\omega_p) = (2\omega_i - \omega_p) + 3\Delta\omega_p \quad (2)$$

If this process is allowed to cascade further by managing the pump-idler powers so that the higher-order idlers are also powerful enough to mix efficiently, the $n^{th}$-order idler will now attain a sweep range and rate at (n+1) times of the original (pump) tunable laser. Taking the whole sweep generated by higher-order mixing into account, the sweep range is enhanced by a factor of $(n+1)(n+2)/2$, while the maximum linewidth is scaled by a factor of (n+1). Consequently the FOM is up-scaled by a factor of $(n+2)/2$. As a result, the performance of a tunable laser can be up-scaled arbitrarily, provided the available power and mixer performance are sufficient for higher-order mixing to occur.

In the second scheme, illustrated in FIG. 2b, instead of requiring that the single mixer performance be sufficient to generate multiple idler waves, separate mixer stages (Mixer 1 & Mixer 2 as shown) can be introduced to create only first-order idlers. In practical terms, this approach would require lower launch power and less stringent mixer engineering. The idler, which acquires twice the sweep range and rate in the first parametric stage, subsequently mixes with spectrally fixed seed in the next stage, thus generating a secondary idler possessing twice the sweep range of the primary idler, or equivalently, quadruple of the original pump. The laser sweep can therefore be enhance arbitrarily by cascading more parametric stages and results in $2^n$ times sweep up-scaling by the idler generated in the $n^{th}$ stage. Following similar analysis, the FOM is scaled by $(2^{n+1}-1)/2^n$ in the cascaded mixing scheme, inferring a FOM up-scaling limit of 2 for high stage count. Even though the FOM cannot be enhanced arbitrarily as in the higher-order mixing scheme, the cascaded mixing scheme provides technically less demanding pathway to up-scale sweep range and rate, which are of higher importance in certain applications. The least practically demanding realization for cascaded CAST would be to enclose the mixer into the recalculating cavity and allow the new idler to be generated during each pass. Unfortunately, not only would the maximal FOM not be reached, but the intracavity noise accumulation would pose significant construction limits.

Finally, by considering two-pump mixing process, illustrated in FIG. 3, further increase in source tuning speed and range can be achieved: the original sweep can be quadrupled, in a single stage and using primary idlers only. Higher-order and cascaded generation is still applicable with dual-pump mixer stage.

Figure 3A:
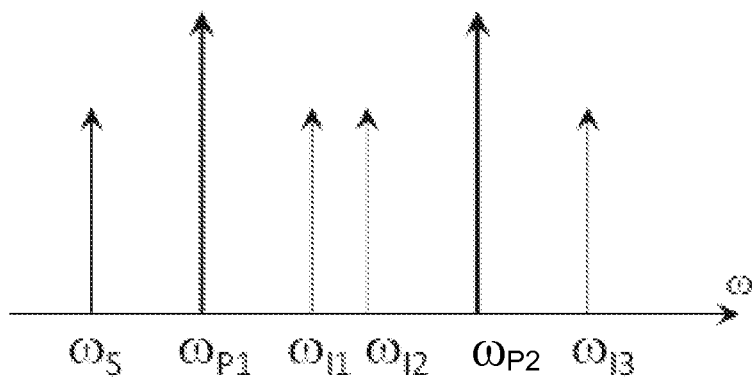
FIGS. 3a-3c are diagrammatic illustrations a two pump mixing process, where
Figure 3B:
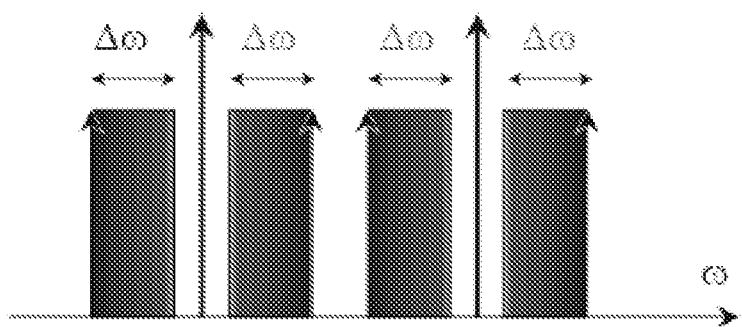
Figure 3C:
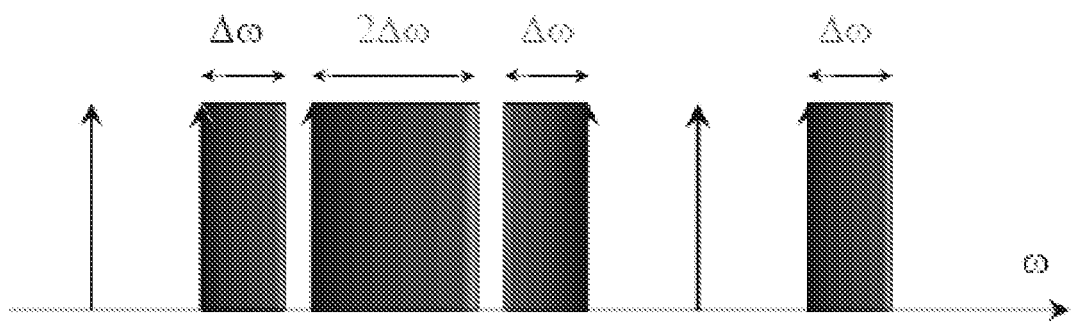
Figure 4:
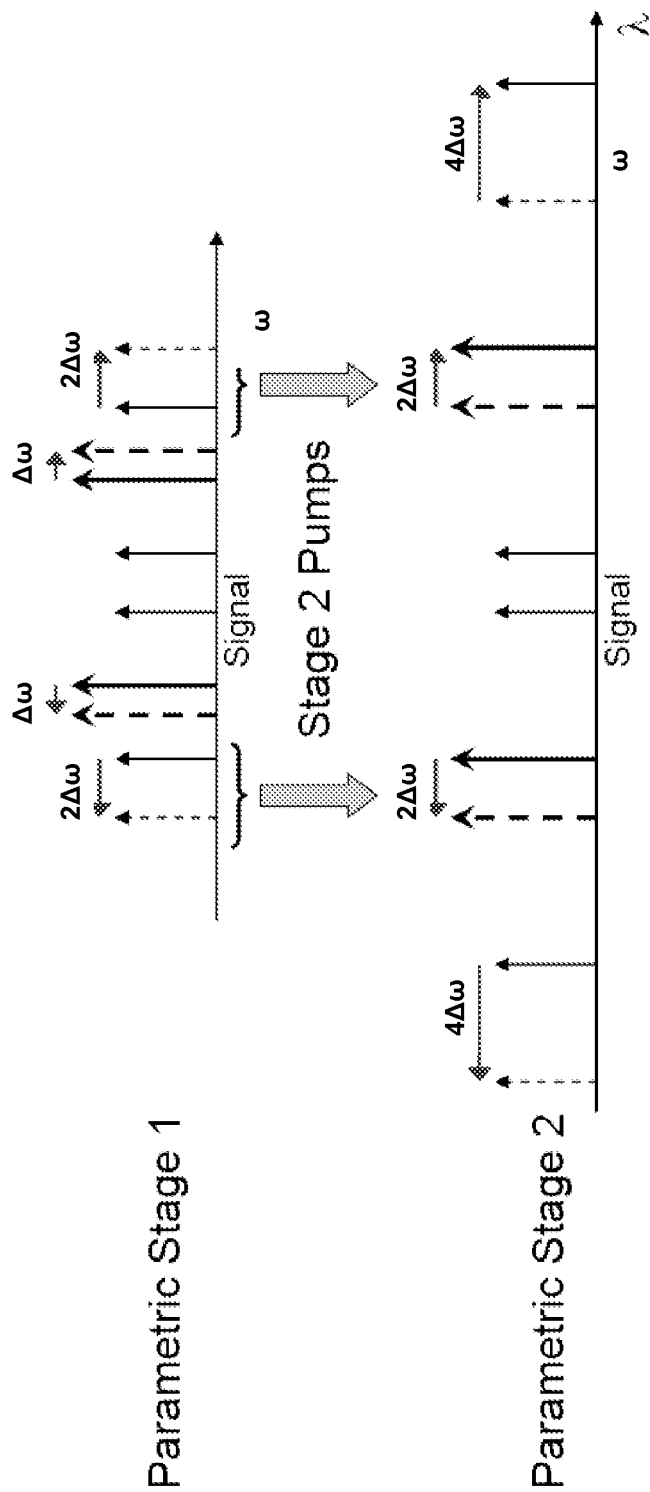
FIG. 4 illustrates multiple-stage tuning with two-pump parametric devices.

A qualitatively different performance can be achieved by considering a multiple-pump parametric process shown in FIGS. 3a-3c, which illustrate a single stage two-pump parametric device. Two optical pumps at fixed pump frequencies $\omega_{p1}$ and $\omega_{p2}$ are used to replicate input seed $\omega_{p1}$, resulting in simultaneous signal amplification and generation of three new idler waves $\omega_{i1}$, $\omega_{i2}$ and $\omega_{i3}$ (FIG. 3a). Seed tone frequency shift $\Delta\omega$ will result in the three corresponding idlers being swept over identical spectral ranges ($\Delta\omega$) in unison (FIG. 3b). A pump frequency shift of $\Delta\omega$ results in a total $5\Delta\omega$ shift, as shown in FIG. 3c. The addition of subsequent two-pump stages would further increase both the bandwidth and the tuning speed. FIG. 4 provides an example of a scheme for providing 8- and 16-fold bandwidth/speed increase. The first stage uses $\Delta\omega$-tuned pump to generate new lines tuned over total of $4\Delta\omega$; new lines pump the second parametric stage to provide a new set of optical lines tuned over $8\Delta\omega$. The initial pump-signal positioning is used to provide either contiguousband or disjoint-band spectral tuning. A cascade of M parametric stages will provide continuous coverage over 4MΔω spectral range. Additional scan-multiplying combinations can be constructed by selecting seed-pump only or seed-pump-pump frequency tuning configurations.

Figure 5:
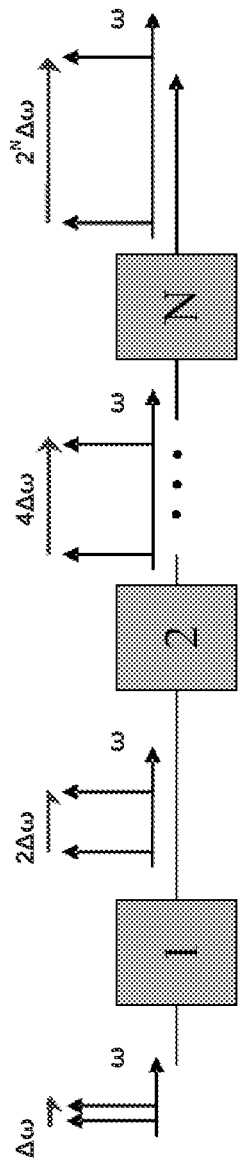
FIG. 5 diagrammatically illustrates a N-Stage parametric cascade composed of one-pump devices multiplies the tuning speed and spectral range of any tunable source by $2^N$.

Single-pass design, either in one- or multiple-pump form can be further generalized by cascading multiple parametric stages. In the least complex configuration, shown in FIG. 5, each one-pump stage operates by passing pumps between the neighboring sections. A (fixed) input wavelength is converted by the first stage into the idler tuned over 2Δλ; this idler then becomes the pump driving the second parametric stage. The output of the second stage is the idler tuned over 4Δλ, eventually defining the Nth stage tuning over $2^N \Delta\lambda$ range. To summarize, a cascade of N parametric stages will increase the figure of merit of any tuning technology by $2^{2N+2}$, as illustrated by Table 1.

TABLE 1

| Parameter | Single Stage Two-Pump | Two Stages Two-Pump | N Stages Two-Pump |
|---|---|---|---|
| Tuning Range Δλ | 4x | 8x | 2N + 1x |
| Tuning Speed (Δλ/Δτ) | 4x | 8x | 2N + 1x |
| Linewidth δλ | 1x | 1x | 1x |
| Figure of Merit | 16x | 64x | 22N + 2x |

$$M = \Delta\lambda \times \frac{\Delta\lambda}{\Delta\tau} \times \delta\lambda^{-1}$$

Figure 6:
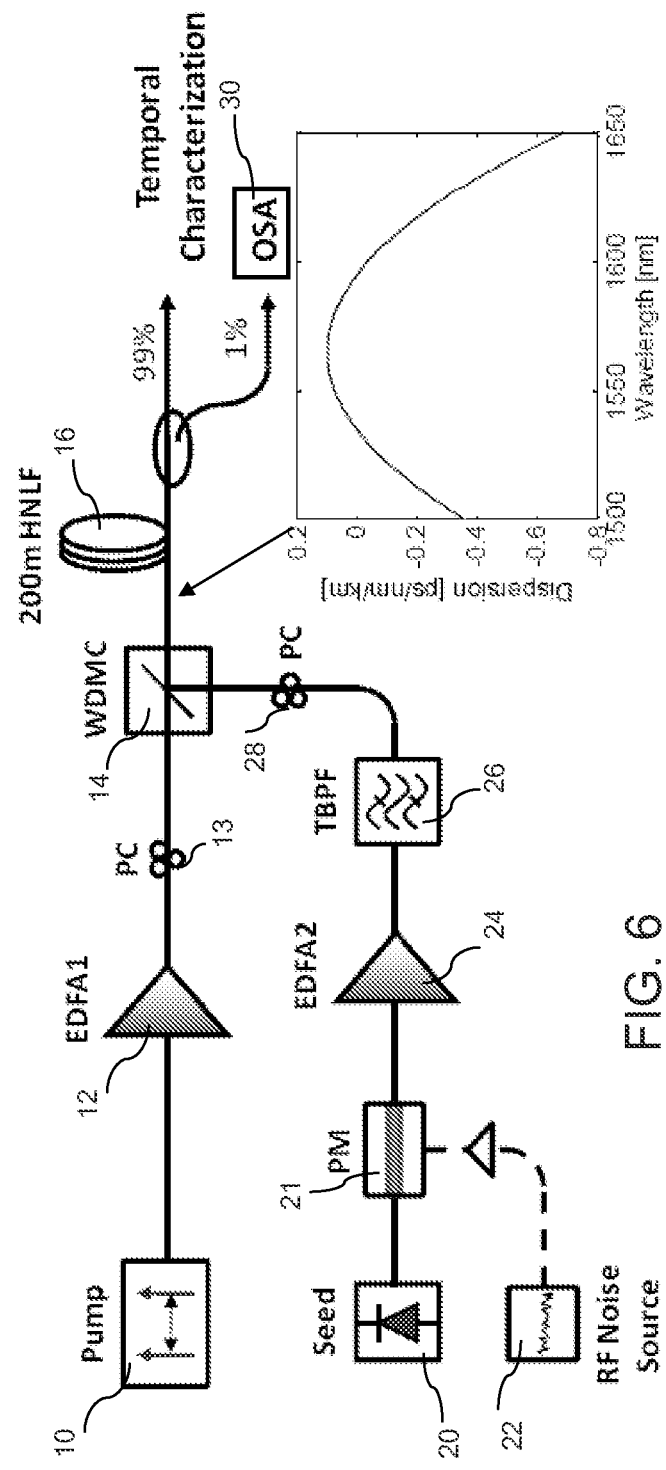
FIG. 6 diagrammatically illustrates an exemplary set-up for higher order mixing. The inset shows the dispersion profile of the fiber.

An exemplary implementation of a setup for demonstrating laser-sweep up-scaling by higher-order mixing is illustrated in FIG. 6. A wavelength-swept laser, which generates a repetitive sweep across 6 nm centered at 1558 nm at a rate of 10000 nm/s, serves as the pump source 10. The tunable pump source may be amplified to 1.5 W by an erbium-doped fiber amplifier (EDFA1) 12, passed through a polarization controller (PC) 13 and filtered by a 5-nm wavelength-division multiplexing coupler (WDMC) 14 to reject nonlinear portion of the laser sweep range, located at the extrema of the sweep band. The seed source 20 is amplified by a second EDFA (EDFA2) 24 and filtered by tunable bandpass filter 26, then passes through polarization controller 28. The WDMC 14 also serves as a low-loss combiner between the pump 10 and the 500 mW, fixed wavelength seed wave at 1537.5 nm. The combined pump and seed are then launched into a spool of 200-m highly-nonlinear fiber (HNLF) 16 serving as the parametric mixing medium. To facilitate wide-band higher-order mixing, a dispersion-flattened HNLF with dispersion below 1 ps/nm/km across the 1500-1650 nm band is preferably used (characteristics shown in the inset of FIG. 6). The nonlinear coefficient of the HNLF is 8 $W^{-1}$ $km^{-1}$. At a seed power level of 500 mW, stimulated Brillouin scattering (SBS) may be observed but can be mitigated by phase-dithering the seed wave with a RF noise source 22 at phase modulator (PM) 21, resulting in a broadened linewidth to 450 MHz. In contrast, the pump should not experience SBS effect, which can be attributed to the inherited linewidth broadening due to the wavelength sweep within the characteristic lifetime of phonons in fiber. In practical terms, SBS suppression can be achieved by differential tension synthesis, circumventing any phase dithering of either the pump or the seed. Maximum idler generation efficiency can be attained by aligning the states of polarizations (SOPs) of the pump and the seed waves using phase controllers 13 and 28. The parametric mixing process may be monitored spectrally by an optical spectrum analyzer (OSA) 30 at the output end of the HNLF 16, and temporally with the procedures described below.

Figure 7A:
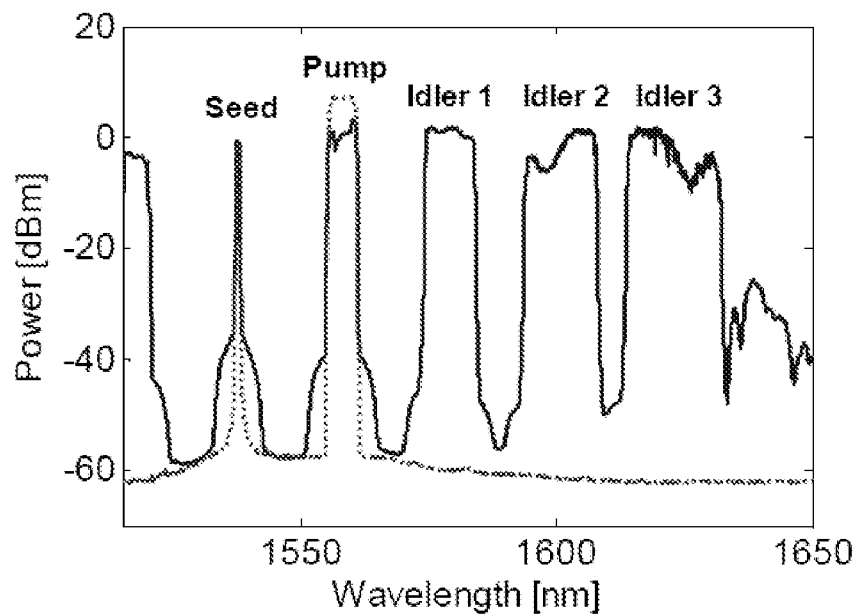
FIG. 7a shows the input and output spectra of the parametric mixer.

FIG. 7a shows the spectra at the input and output of the HNLF. The widening of spectral width of idlers clearly depicts an enhancement in sweep range, scaling proportionally with the idler order. Efficient generation of idlers up to third order may be observed with power ripple of 12 dB across a total bandwidth of 77 nm, spanned by the pump and three generated idlers. The power ripple is a result of non-negligible second-order polarization mode dispersion (PMD) in the fiber span of 200 m, which can in principle be reduced by shortening the fiber at the expense of elevated pump power requirement. Alternatively, a near-isotropic HNLF class can be used while maintaining the overall efficiency of the mixer.

Figure 7B:
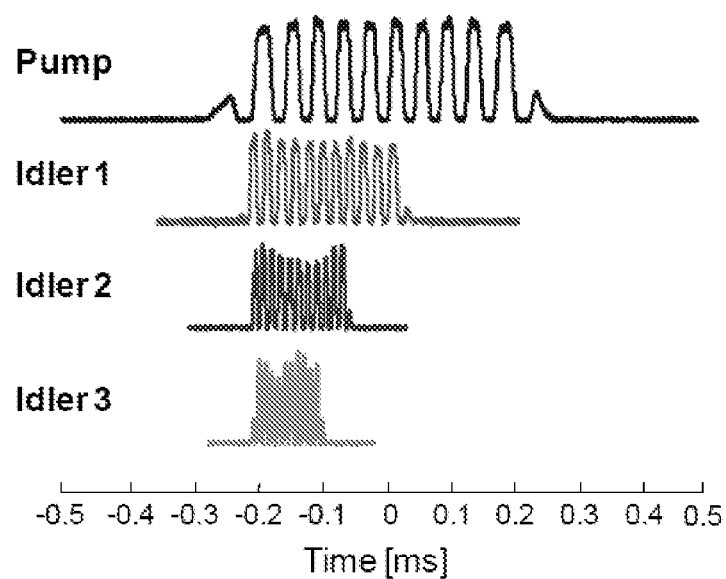
FIG. 7b shows temporal traces at the interleaver output of the pump and idlers after filtering.

The sweep rate of individual components (pump and idlers) can be inspected by filtering out a 4-nm slice of the spectral component of interest (either the pump or a particular idler), and subsequent filtering by a periodic spectral element (interleaver) with free-spectral range (FSR) of 50 GHz. At the output of the interleaver, the sweep can be visualized as the laser sweep across the periodic transmission profile, resulting in waveforms shown in FIG. 7b. In simple terms, the spectrally periodic interleaver response was mapped to periodic temporal response, with period strictly defined by the laser tuning speed. Reduction of the temporal period can be observed from the pump to the third-order idler, thus proving the assumption that the sweep rate is enhanced by strict arithmetic order as predicted.

In order to investigate the instantaneous linewidth of the mixing products, a modified heterodyning scheme was constructed. The output light after 4-nm filtering was combined with a tunable external cavity laser (ECL) with a line-width of 100 kHz and the wavelength coinciding the center wavelength of the component being investigated. Coherent mixing between the static laser and the sweeping component resulted in a chirp waveform generated at a photo-detector with 18 GHz bandwidth. The waveform was recorded by a real-time oscilloscope with bandwidth of 16 GHz, and the relative phase noise of the sweeping component was then retrieved by using an instantaneous linewidth measurement algorithm, which will now be described.

When the output of a laser-under-test (LUT) is combined with a coherent field at the same average frequency as of the LUT from a reference (Ref) laser with linewidth considerably narrower than the LUT, the heterodyne signal, obtained by detecting the power of the resultant field, can be expressed as follows:

$$p(t) = P_{LUT}(t) + P_{Ref}(t) + 2\sqrt{P_{LUT}(t)P_{Ref}(t)}Re\{\exp[j(\phi_{LUT}(t) - \Phi_{Ref}(t))]\} \quad (3)$$

If the power of both laser is constant over time, the heterodyne signal p(t) carries only the relative phase noise ($\phi_{LUT} - \phi_{Ref}$) information. Since the phase noise of the reference laser is assumed to be much smaller than the LUT, the phase of the reference field $\phi_{Ref}$ thus becomes static and exercises no influence on p(t). Based on these two assumptions, the complex electric field $A_{LUT} = A_R + jA_I$ of the LUT can then be retrieved by applying Hilbert transform H[•] on the DC-rejected heterodyne signal $P_{AC}(t)$ as follow:

$$A_R \propto P_{AC}(t) = 2\sqrt{P_{LUT}P_{Ref}}Re\{\exp[j(\phi_{LUT}(t) - \phi_{Ref}(t))]\}$$

$$A_I \propto H[P_{AC}](t) = 2\sqrt{P_{LUT}P_{Ref}}Im\{\exp[j(\phi_{LUT}(t) - \Phi_{Ref}(t))]\} \quad (4)$$

Figure 8A:
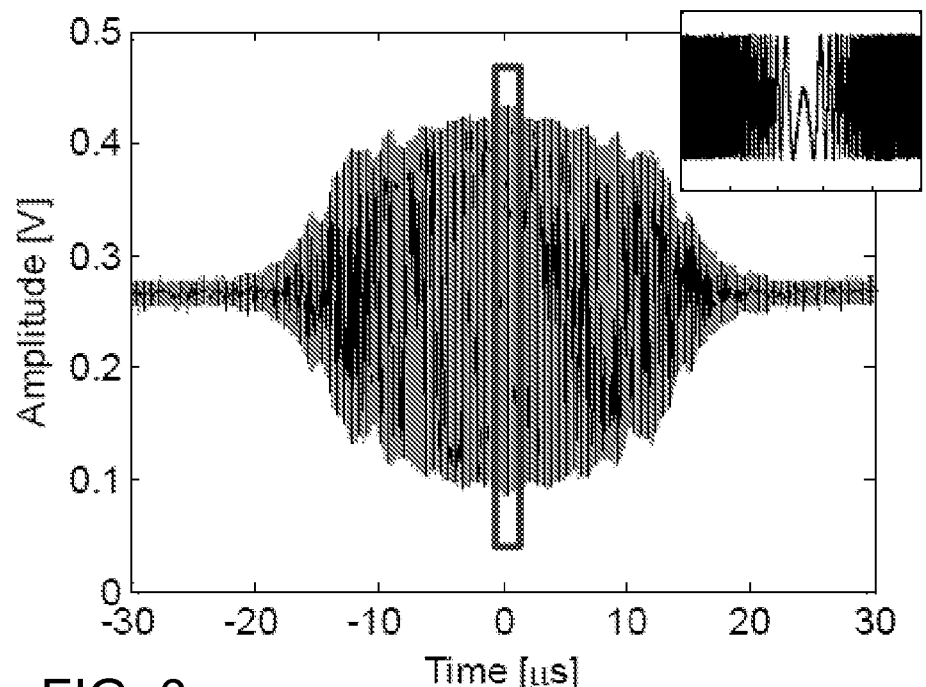
FIG. 8a shows the heterodyne signal between the wavelength-swept pump source and a static laser.
Figure 8B:
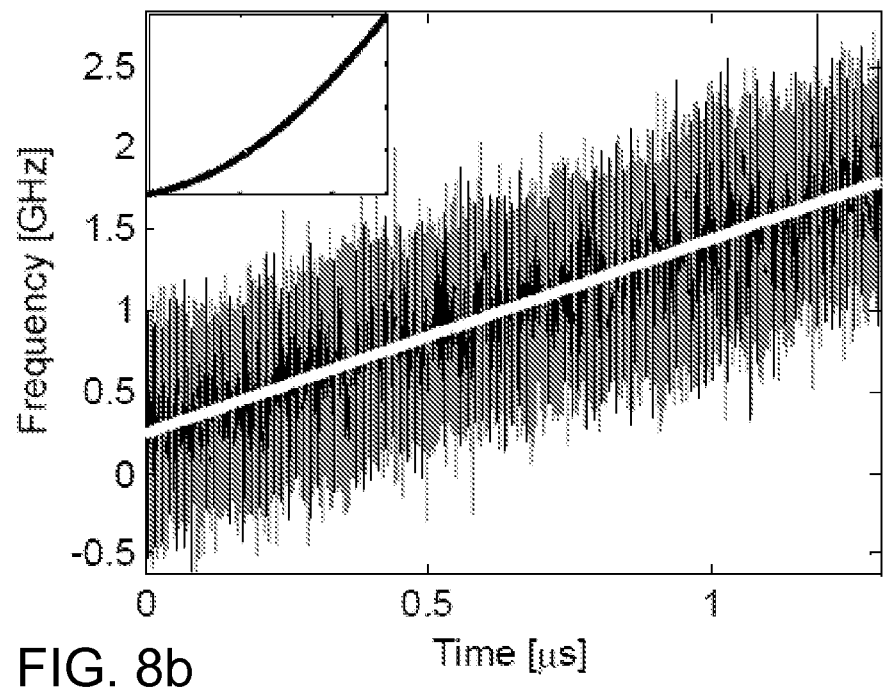
FIG. 8b shows the retrieved instantaneous frequency of the pump source.

If the LUT is subject to a (linear) frequency sweep, the heterodyne signal will then contain a fast (linear) chirp component. This chirp component is a result of a rapidly (quadratic) increasing phase and is independent to the intrinsic phase noise of the LUT. An example is shown in FIG. 8a, which shows the heterodyne signal between the same wavelength-swept pump source described above and a static laser. The inset shows a zoom-in view of the waveform around t=0 with a time-span of 600 ns. In order to retrieve the phase noise covered by this non-static component, the frequency sweep of the LUT should be retrieved and cancelled. Using the same treatment described in Equation 4, the phase of the LUT is reconstructed, revealing the quadratic phase and thus linear frequency sweep with respect to time as shown in FIG. 8b. The solid line in the frequency-time plot corresponds to the frequency extracted by polynomial fitting the retrieved phase followed by a first-order derivative operation.

Figure 9A:
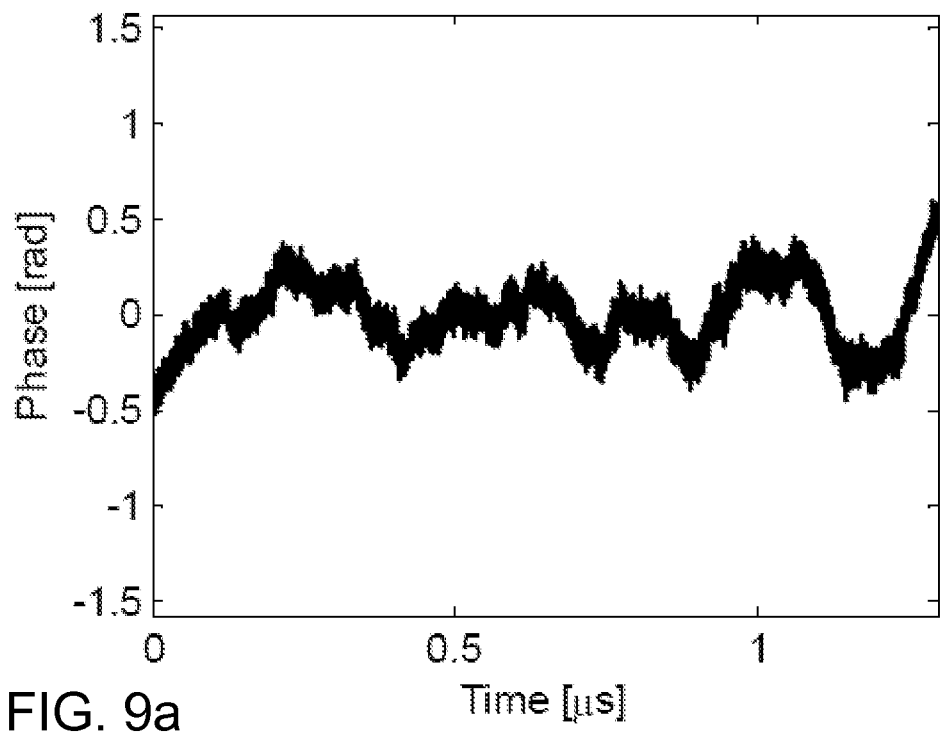
FIG. 9a is a plot of the temporal phase noise evolution retrieved after the polynomial fit.
Figure 9B:
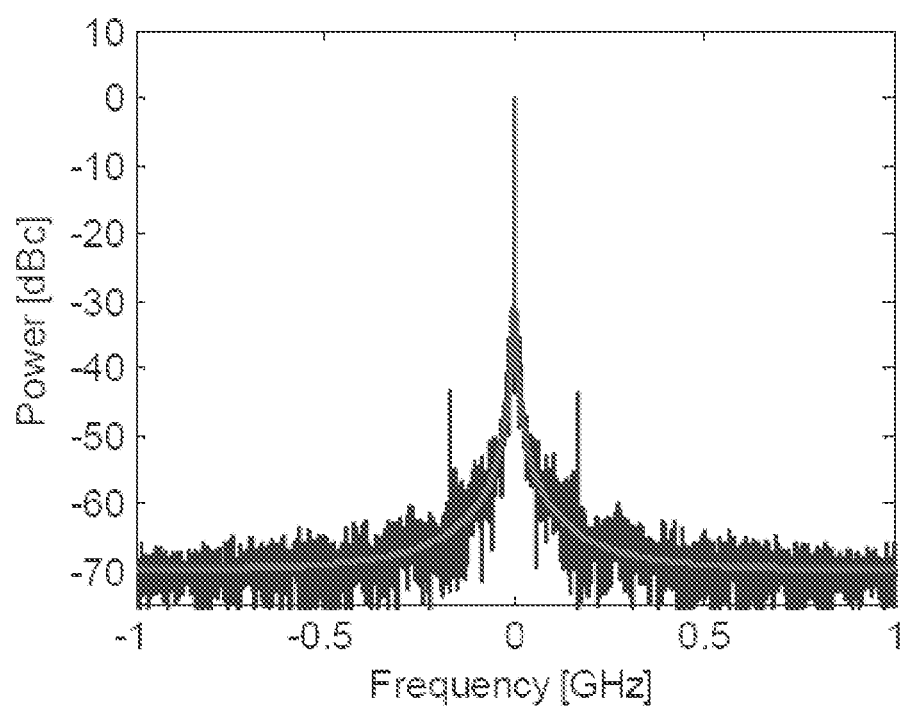
FIG. 9b is a graph of the power spectrum of the reconstructed field and the Lorentzian line-shape fit.

Noticing the polynomial (nearly quadratic) nature of the phase evolution, the contribution of the frequency sweep can be subtracted from the retrieved phase by a polynomial fit. In practice, a polynomial fit of up to third order may be required to account for the nonlinearity of the frequency sweep, however higher-order fit should be avoided as the excess degree of freedom in root placement can lead to undesired removal of low-frequency phase noise. The underlying phase noise retrieved after polynomial fit is depicted in FIG. 9a. Although the heterodyne signal is recorded for 60 µs, only a 1.3-µs slice of the trace is retained for phase noise measurement in order to eliminate the effect of non-uniform frequency response of the photo-detector and the oscilloscope which gives rise to amplitude ripple as shown in FIG. 8a. The line-shape of the LUT can now be reconstructed with the availability of phase noise, as shown in FIG. 9b. A Lorentzian line-shape function fit to the reconstructed line-shape provides a better measure of line-width (178.6 kHz) as shown in FIG. 9b.

Figure 10:
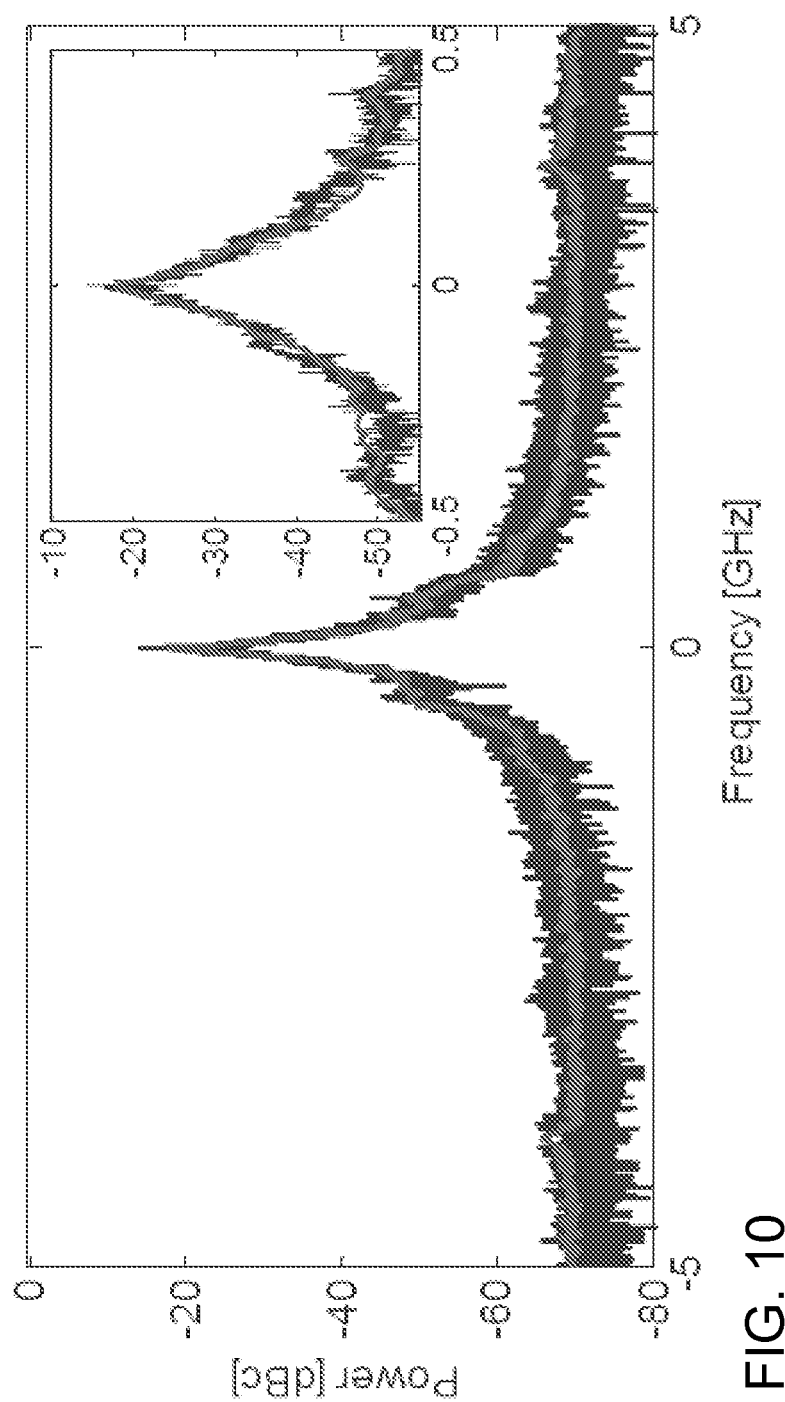
FIG. 10 is a plot of the power spectrum of the reconstructed idler overlaid with the measured spectrum of the seed laser.

In order to confirm the accuracy of the instantaneous line-width retrieval algorithm described here, the measurement result obtained with this algorithm is compared against the measurement made by a commercial high-resolution OSA (Agilent 83453B). The comparison is done by measuring the line-shape of the stationary seed wave used in stage 2 of the cascaded mixing scheme, whereas the described algorithm is deployed to retrieve the line-shape of the generated idler. Since the resolution of the OSA is limited to 1 MHz, a distributed-feedback (DFB) laser diode with line-width of 10 MHz replaces the seed laser (ECL) used in the previous setup which has a sub-MHz line-width. The use of the broad linewidth seed laser also reduces the influence of pump source line-width in the comparison. FIG. 10 shows the retrieved power spectrum of the idler overlaid with the spectrum of the stationary seed laser measured by the OSA. The inset shows a zoomed-in view of the spectra with a 1 GHz span. The excellent agreement between the retrieved instantaneous line-shape spectrum and the static measurement performed with the commercial OSA confirms the credibility of the described algorithm.

Figure 11A:
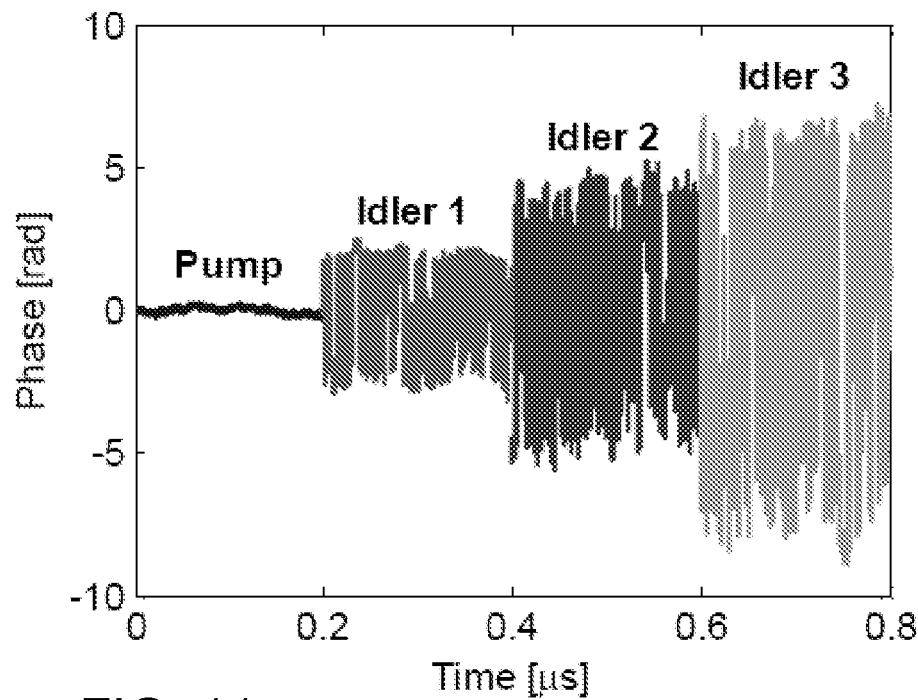
FIG. 11a shows the retrieved phase noise on the pump source and the generated idlers represented in the time domain.
Figure 11B:
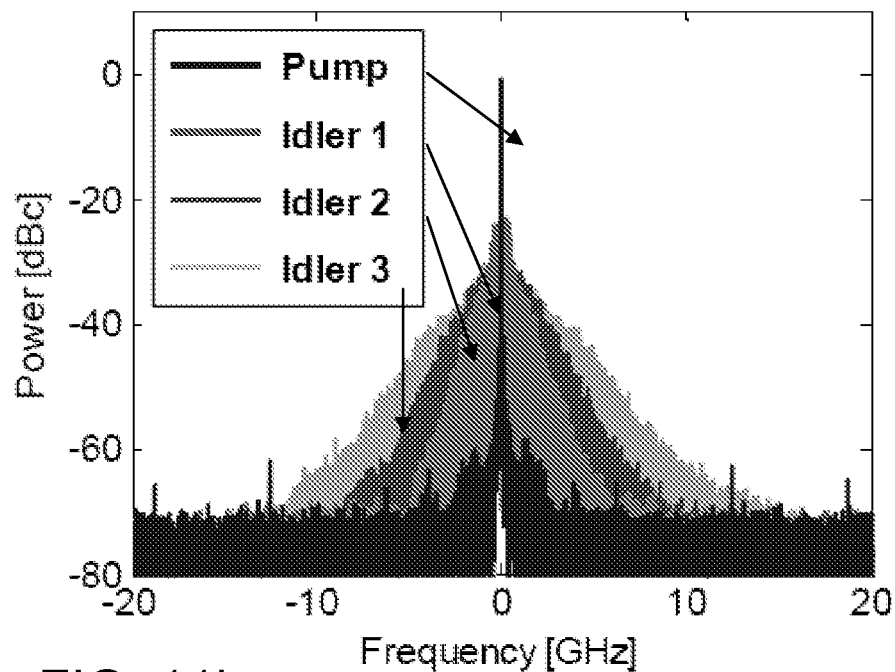
FIG. 11b shows the reconstructed spectra of the pump and idlers.

FIG. 11a shows the retrieved phase noise and line-shape for the pump and the idlers. Increased phase noise observed in the first-order idlers is inherited from the phase-dithered seed wave. The phase noise amplitudes of the higher-order idlers increase proportionally to the order of idlers as a result of temporal phase matching. Consequently the higher-order idlers acquire broader line-width as shown in FIG. 11b. Such line-width broadening can be eliminated when phase-dithering can be avoided, for example, by using synthetically strained fiber with higher SBS threshold. Using a pulsed seed source with pulse width below ns-regime also eradicates the necessity of phase-modulation, although the generated idlers will also acquire the same pulse modulation.

Figure 12:
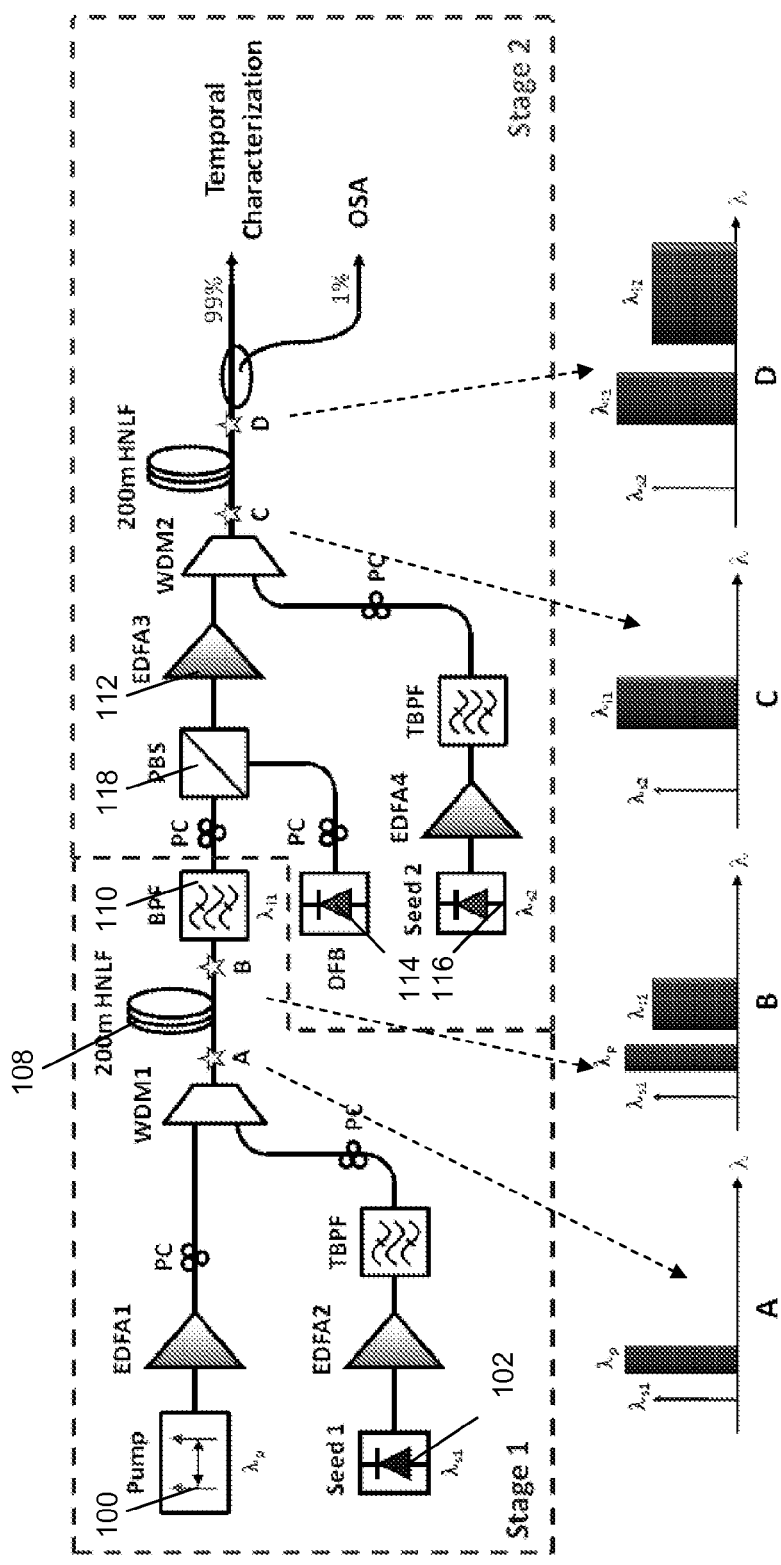
FIG. 12 illustrates a set-up for CAST through cascaded mixing, where the insets show the pictorial representation of the spectral components at the input and output of each stage.

In a second implementation, the need for higher-order mixing which mandates the use of high power pump and seed waves can be eliminated by using cascaded parametric stages. The setup, shown in FIG. 12, includes two parametric mixing stages. Stage 1 has similar topology to the setup shown in FIG. 6, except the seed power of seed light 102 was lowered to 140 mW, thus eliminating the need for SBS suppression and phase dithering. The power of pump 100 was reduced to 1 W to avoid efficient generation of higher-order idlers and the need for complex filtering scheme at the output. The first stage idler (at 1579.1 nm) output from mixer 108 was filtered by a fixed, 19-nm wide band-pass filter (BPF) 110 centered at 1576.5 nm. The idler was subsequently re-amplified by EDFA3 112 to 1 W and combined with the second seed light 116 at 1554.1 nm with a power level of 43 mW. Since part of the pump sweep band was removed by band-pass filtering b 110 in the first stage, temporal gaps were created within the waveforms corresponding to the pump and the idler. Consequently, 1600 nm distributed feedback (DFB) laser 114 was used to clamp the transients in the EDFAs. The average power at 1600 nm is maintained to be at least 10 dB lower than that of the idler by offsetting the polarization of the DFB laser 114 from the transmission axis of the polarization beam splitter (PBS) 118. The output (mix product) from both stages was monitored spectrally and temporally using the methodologies described in with reference to the embodiment of FIG. 6.

Figures 13A, 13B:
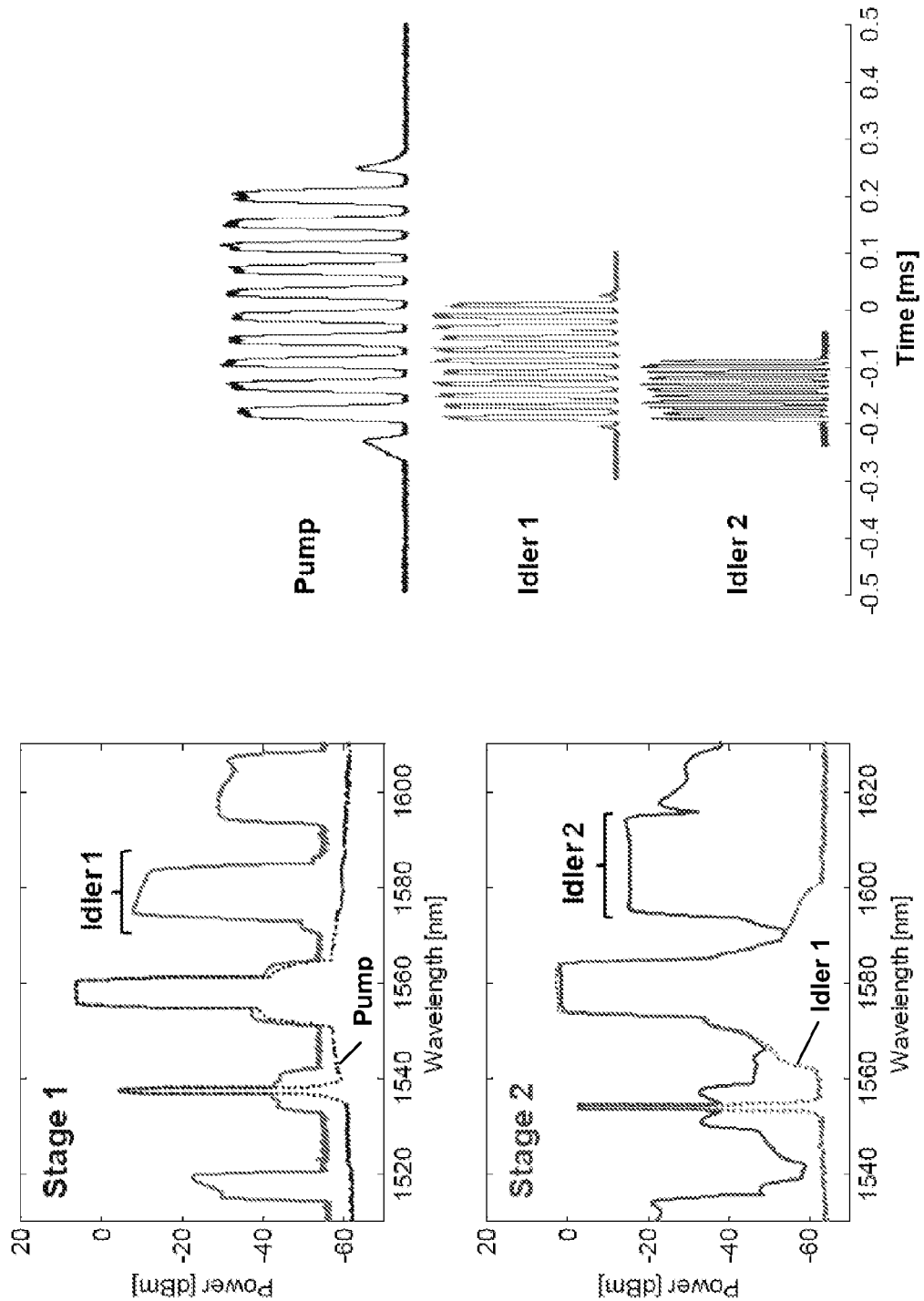
FIGS. 13a and 13b illustrate the input and output spectra of the parametric mixer stages and temporal traces of the labeled waves after the interleaver, respectively.

The spectra shown in FIG. 13a demonstrate a qualitatively different operation regime than that of a higher-order, single-stage mixer. In contrast to a high-order mixer that requires a high-power seed, the cascaded approach relies on a low power seed: the first-order idler efficiency is still maintained, with simultaneous suppression of higher-order terms. A spectral tilt experienced by the first-order, first-stage idler (idler 1) can be deliberately introduced by controlling the pump power to shape the idler generation efficiency spectrally. The spectral tilt subsequently cancels the gain tilt introduced by EDFA3 112, resulting in a spectrally flat pump source for second stage. The combination of the pump spectral equalization and the reduction of higher-order PMD effects stemming from the smaller mixer bandwidth results in an in final power ripple of only 1.2 dB. A staged increase in sweep bandwidth from 5 nm to 20 nm and corresponding compression of the temporal fringe period from 40 µs (original pump) to 10 µs (output, idler 2) confirms a four-fold enhancement in both sweep range and rate, as shown in FIG. 13b.

Figure 14A:
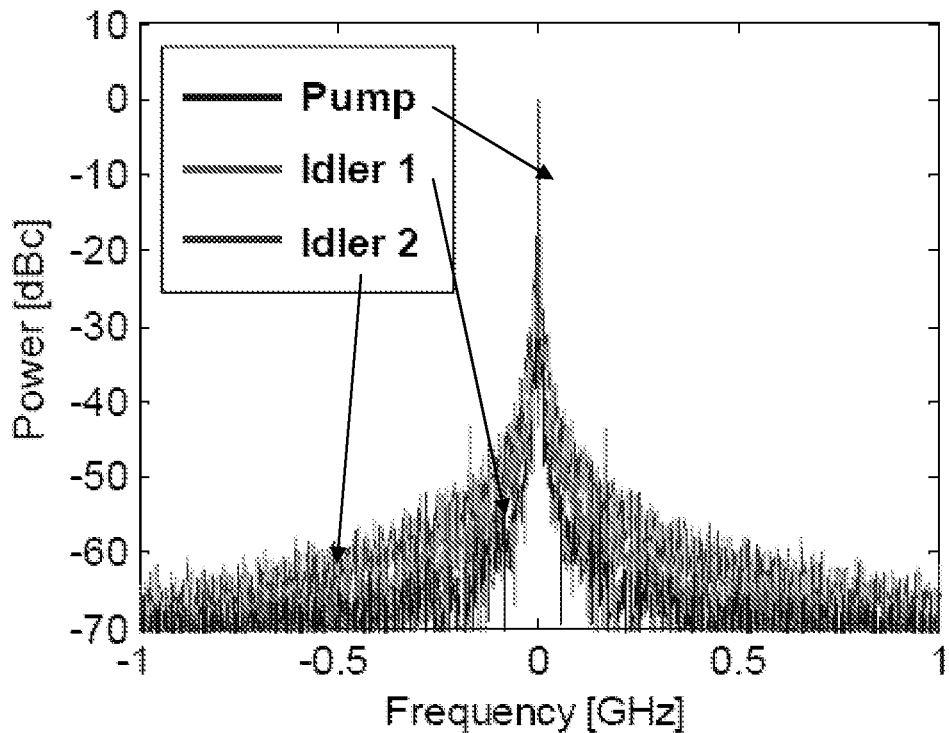
FIGS. 14a and 14b are plots of the reconstructed spectra of the original pump source and the idlers generated in stage 1 and stage 2 (14a) and an expanded view of the fitted Lorentzian lineshapes with their respective FWHM labeled.
Figure 14B:
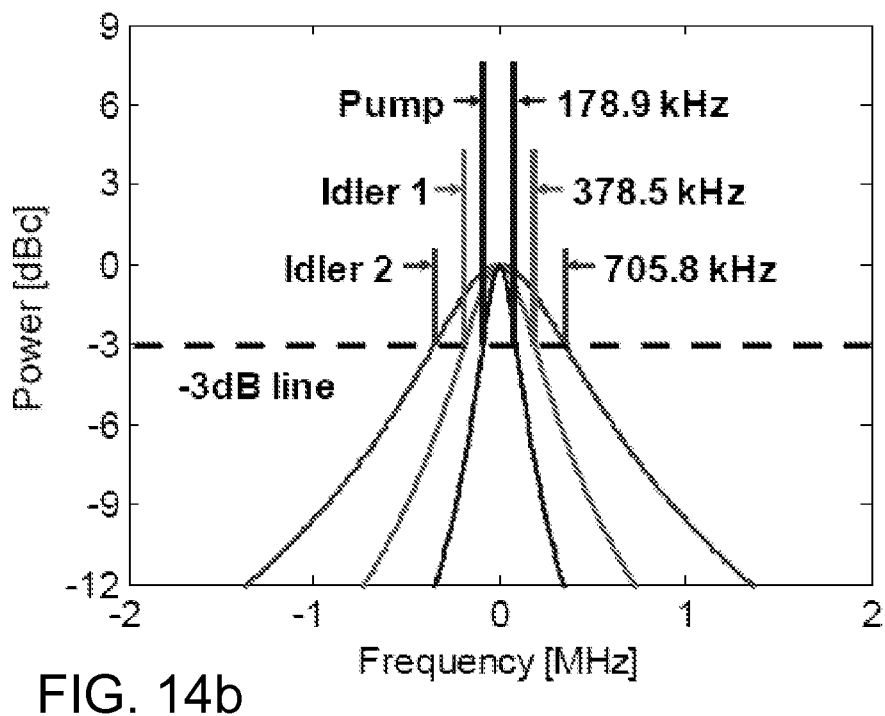

Finally, the instantaneous line-width of the pump and each idler are characterized and shown in FIGS. 14a and 14b. The line-shape spectra shown in FIG. 14a are obtained with a measurement interval of 1.3 µs and averaged over five measurements. The spectral shape resembles a typical Lorentzian line-shape. The full-width at half-maximum (FWHM) line-widths are revealed by fitting the spectra with Lorentzian functions, as shown in FIG. 14b. The line-width of the idler in each stage is approximately twice of their respective pumps, a direct consequence of conservation of energy in FWM process.

Figure 15:
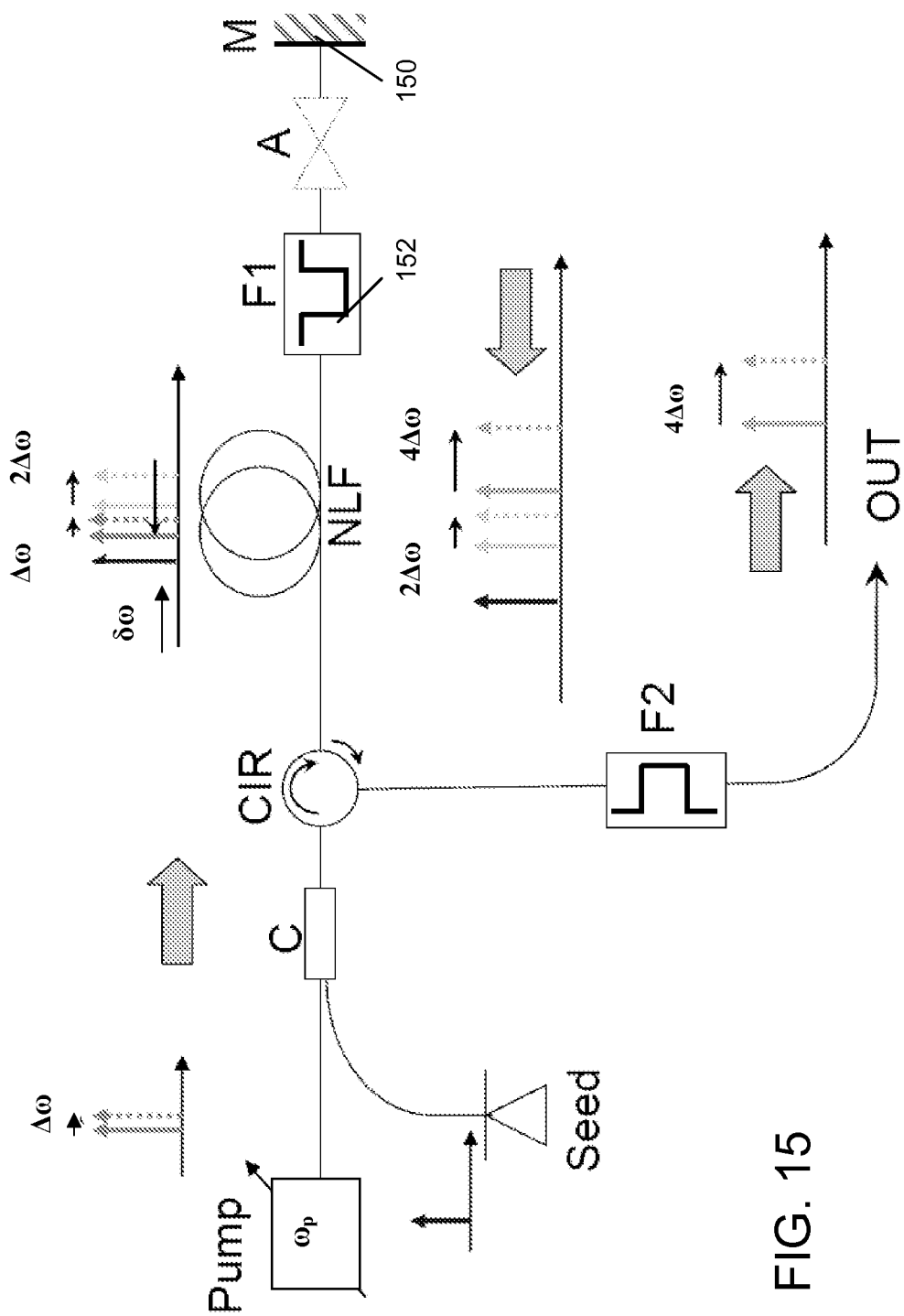
FIG. 15 shows an embodiment of a two-stage folded tunable parametric architecture.

In an alternative embodiment, the complexity of a two-stage configuration can be reduced by introducing the folded design, as shown in FIG. 15. Optical mirror M 150 can be either broadband or spectrally selective (thus integrating the function of the filter F1 152) returns the seed and two tones generated by the first stage in order to produce the output tuned over 4Δλ.

Figure 16A:
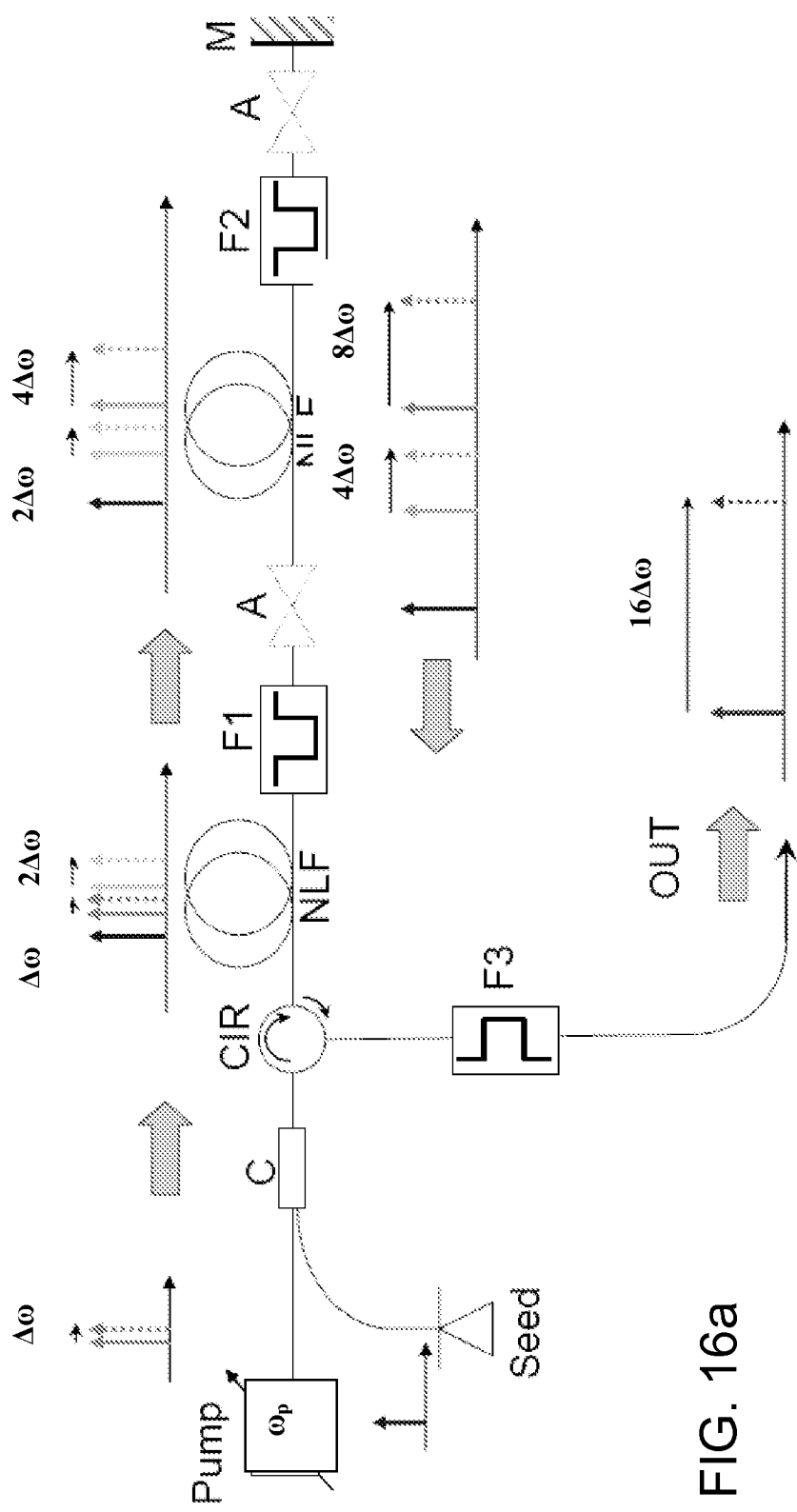
FIG. 16a illustrates an exemplary four-stage folded tunable parametric architecture according to the present invention.
Figure 16B:
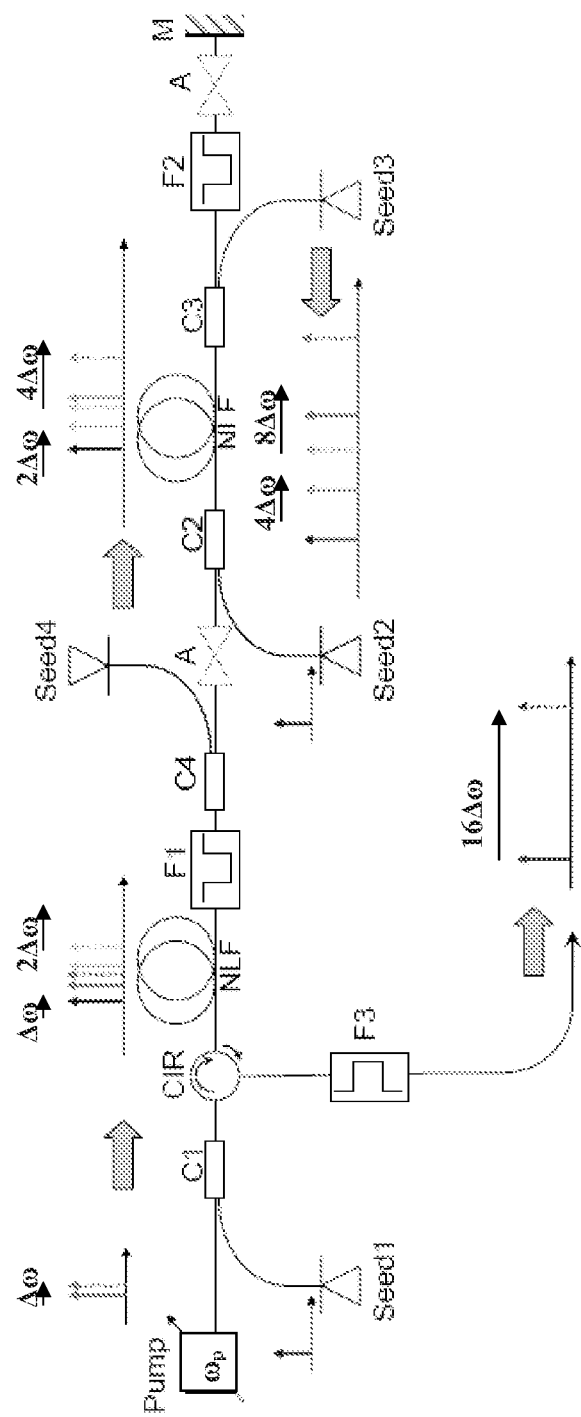
FIG. 16b illustrates an embodiment of a four-stage folded tunable parametric architecture with independently controllable seeds.

The mirrored (folded) design can be applied to more complex configurations (more than two parametric stages) in order to further increase the figure of merit (FOM) of the tunable source. FIG. 16a shows a four-stage tunable design providing 16-fold increase tuning range and tuning speed. FIG. 16b shows a four-stage tunable design with independently controllable seeds. Here, the source figure of merit (FOM) increases by 256 times with respect to the original device (tunable pump laser). As a practical example, consider the pump laser tuned over 10 nm during 100 μs; the output from four-stage parametric source then has a tuning range in excess of 150 nm that can be covered in less than 10 μs. In other words, the parametric cascading will increase original tuning speed of 0.1 nm/μs to 25.6 nm/μs, while simultaneously increasing the range by order of magnitude.

Nonlinear waveguide dispersion management is required in order to achieve wide-band, equalized source performance. The efficiency of four-photon mixing (FPM) process in either one- or multiple-wave architecture depends on phase-matching among participating waves that include seed (signal), pump and idlers. In ideal (zero-dispersion) nonlinear waveguide, the FPM efficiency is independent on spectral separation between the interacting waves, thus providing, at least in principle, unlimited tuning range. The practical nonlinear waveguide, such as highly nonlinear fiber (HNLF) or photonic crystal fiber (PCF) have tailored, but finite chromatic dispersion that defines the efficiency and the bandwidth of the FPM process. Increase in both can be achieved by: 1) use of single-segment, dispersion managed fiber; 2) use of concatenated, dispersion managed design that combines dissimilar fibers; or 3) multiple-pump design in which dispersion (phase-matching) errors are compensated by pump spectral tuning. In practice, the waveguide dispersion fluctuates along the fiber length, reducing the useful FPM bandwidth. Furthermore, it can be shown that statistical properties of these fluctuations can be directly correlated to the available FPM bandwidth. A set of engineering rules that can be used to maximize the bandwidth of FPM process in stochastic nonlinear waveguide include: a) minimization of local dispersion fluctuation; b) spatial decorrelation of dispersion fluctuations; and c) concatenation of precisely measured and matched waveguide segments.

Importantly, low-dispersion fiber (such as HNLF) characteristics cannot be measured by any presently available commercial means. Indeed, the dispersion slope of the last generation HNLF fiber is up to 40 times lower than that of conventional SMF. A precise parametric design requires precise longitudinal dispersion knowledge, not possible by any practical means today. A new high-resolution dispersion measurement of low-dispersion fiber that will provide 100-fold increase in present measurement accuracy is disclosed in International Publication No. WO2009/039274 and U.S. Pat. No. 7,796,244, which are incorporated herein by reference.

Operating spectral window is defined by chosen waveguide platform and seed-pump sources. HNLF represents a mature 1550-nm platform with demonstrated bandwidth in excess of 200 nm; a band-specific silica HNLF can, in principle, be engineered between 1200 and 1900 nm. The lower limit is imposed by strong material dispersion and inability to design step-index fiber with the adequate waveguide dispersion contribution. The upper limit of 1900 nm is dictated by the elevated silica loss impairing the efficiency of the FPM exchange. In principle, both spectral limits can be further expanded: lower spectral limit of 1200 nm can be pushed to near-400 nm range by abandoning the step-index HNLF design in favor of photonic crystal fiber (PCF); the upper limit of 1900 nm can be extended by reduced-length or Raman-aided design. However, the practical (or opportunistic) approach would imply that either tunable or comb source be initially constructed either at 1500 or 1300 nm band and then mapped to the band of interest. This approach is motivated not only by the availability of mature, band-optimized fibers, but also by the wealth of the existing tunable devices, amplifiers and filters required for construction of cascaded tunable systems.

Figures 17A, 17B:
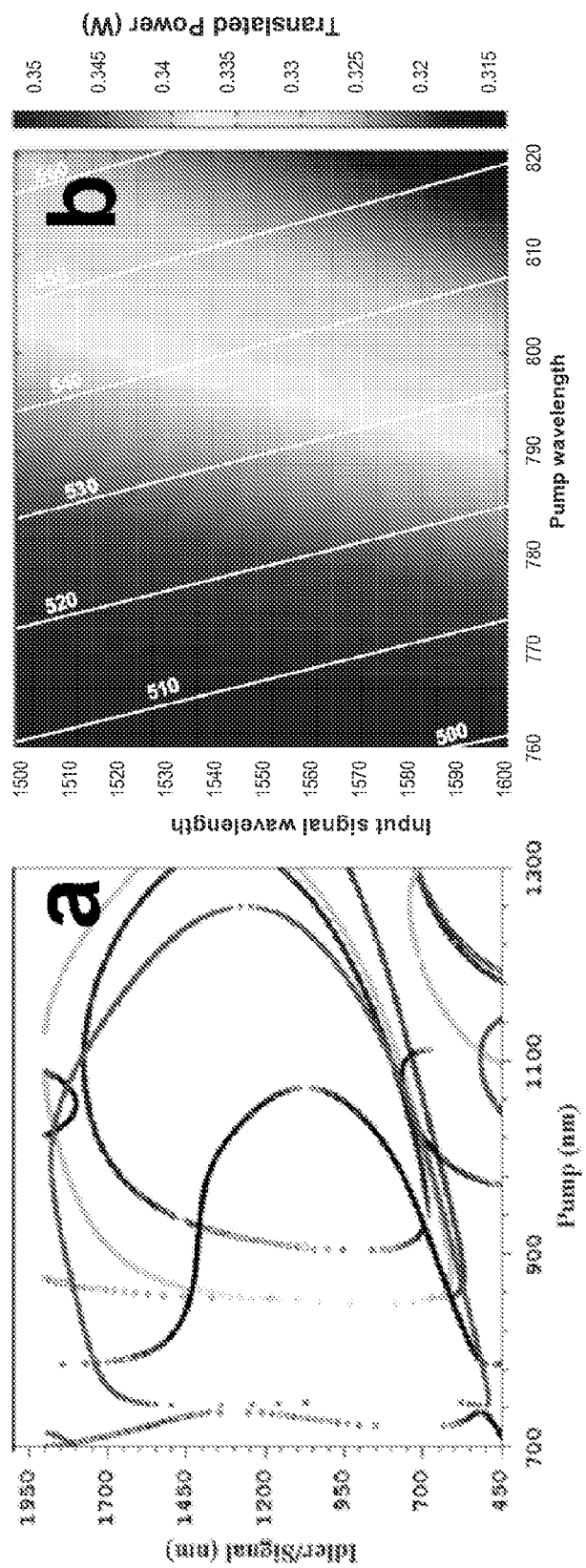
FIG. 17a is a plot of the design space (idler signal versus pump) showing the pitch and form factor variation used to synthesize any phase matching characteristic.
FIG. 17b is a plot showing the two-pump PCF parametric translator dynamic range, with input signal wavelength versus pump wavelength.

Silica PCF is transparent in 400-1800 nm range and is identified as ideal high-confinement platform for efficient 1550→visible band translation. Nanostructured PCF combines nonlinear parameter (γ) in excess of 100 W$^{-1}$ km$^{-1}$ and maximal background loss of 0.1 dB/m within the entire region of interest. More importantly, nanostructured transverse geometry serves as a basis for nearly-arbitrary dispersion synthesis. An efficient inter-band translation technology is based on a basic notion that for any (defined) band-translation a unique dispersion characteristic can be synthesized to reach maximal conversion efficiency. FIG. 17a reinforces this idea by illustrating diversity of the available phase-matching curves that can be synthesized by simple variation of primitive PCF cell structure. More complex designs will introduce dissimilar primitive cells and/or layered design across the PCF cross-section. The existence of practical (but non-optimal) solution is indicated in FIG. 17b: a moderate pump power (1 W) is sufficient to generate more than 300 mW within the deep visible band. Combined control of transversal and longitudinal PCF geometry forms a basis for precise parametric design. An optimal band translation will be reached by solving two closely coupled inverse problems: the solution of the first inverse problem will be reached by fully depleted parametric model, producing fabrication targets for dispersion and nonlinear spatio-spectral functions $D(z,\lambda)$, $\gamma(z,\lambda)$. A second inverse problem is solved consecutively in order to synthesize transverse and longitudinal PCF geometry to reach maximal translation efficiency.

Figure 18:
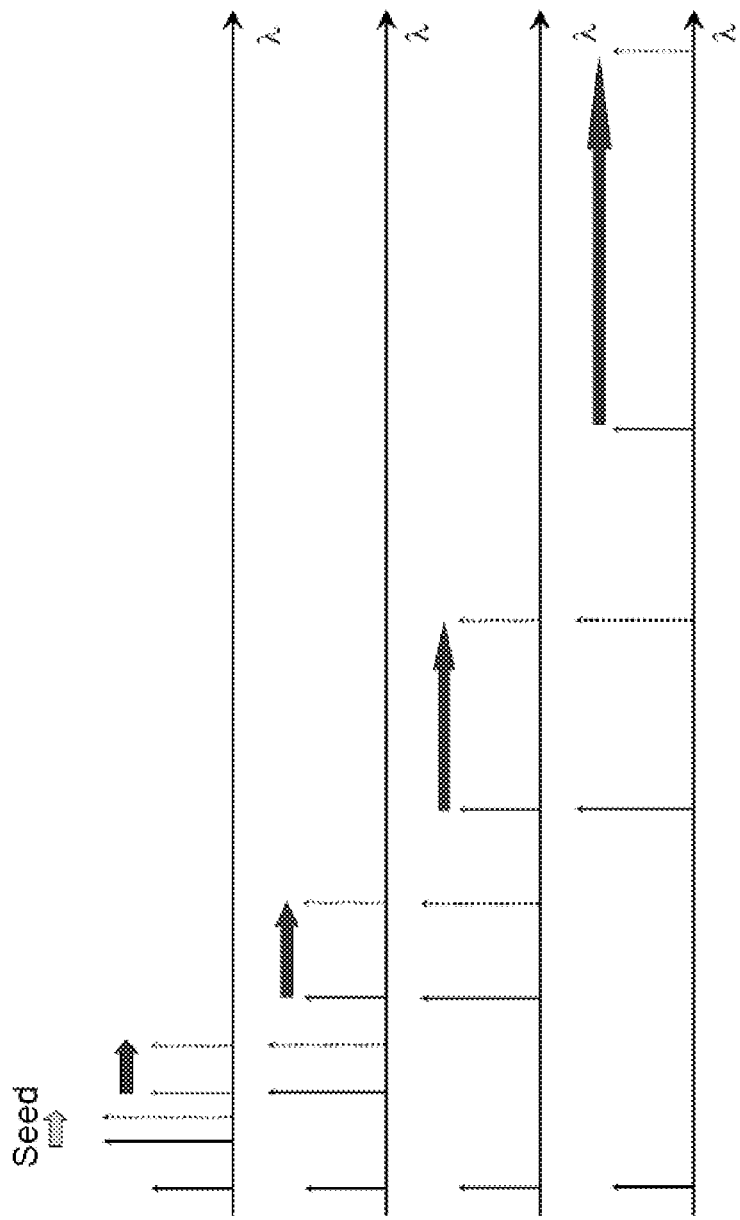
FIG. 18 shows the input tunable state (seed) passing through a cascaded parametric design with increased tuning range and speed indicated by the arrows.
Figure 19:
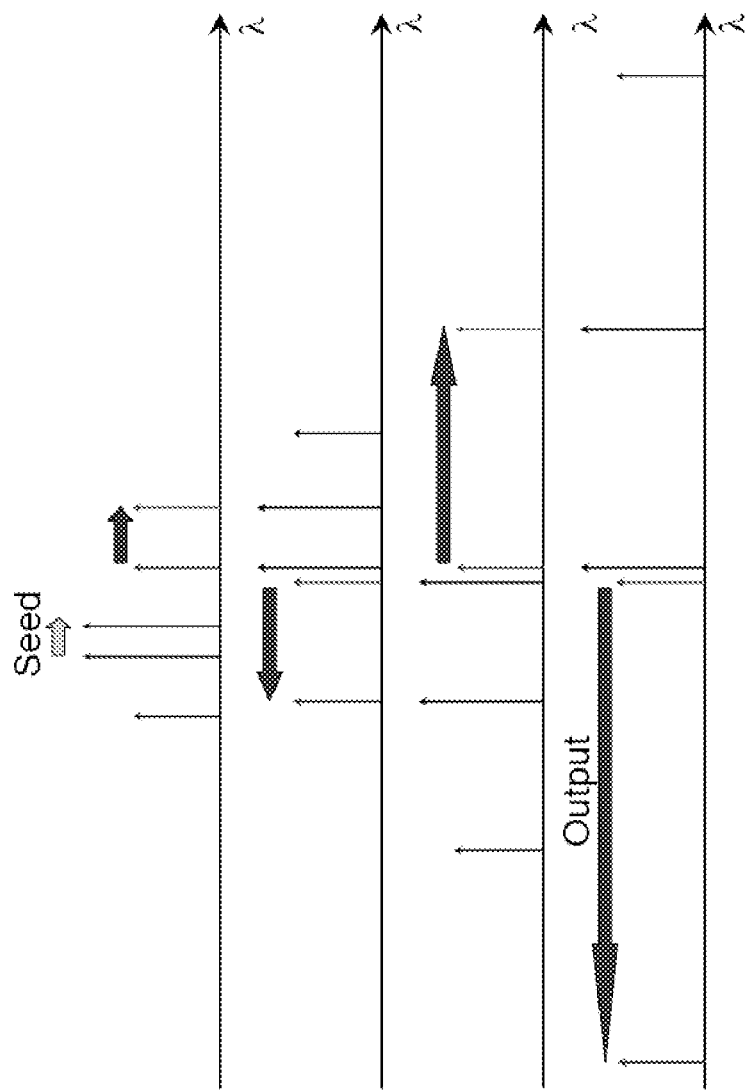
FIG. 19 illustrates a double-sided cascaded parametric design.

An important consideration in cascaded tunable design outlined above is spectral management of intermediary wavelengths used towards the final (output) tunable lines. FIG. 18 illustrates the straightforward, single-sided wavelength management in which seed tuning range is multiplied 16-fold by the simplest (one-pump) parametric process. The dispersion management associated with this design is considered more challenging than that shown in FIG. 19: the final (output) tunable state is reached by double-sided wavelength management. While the intermediary inputs in single-sided design always sweep along the same direction (increasing wavelength in this case), defined by the seed sweep sign, the sweeping direction associated with double-sided intermediary inputs alternate and can be used to cover nearly-contiguous spectral range.

Multiple-wavelength sources can be divided into broad classes of coherent and incoherent devices. A common (incoherent) example is given by a set of independent, spectrally equidistant sources combined by a conventional WDM multiplexer (array waveguide or power combiner): its spectrum forms a fixed (CW) wavelength comb. Constituent lines (comb frequencies) are uncorrelated in phase and intensity since they originate from independent (free-running) laser devices. WDM-multiplexed source is also highly impractical construct since it implies unnecessary complexity (100-line comb requires 100 precisely stabilized lasers) and limited flexibility (comb spectral density is limited by the performance of WDM multiplexer block). An alternative approach uses a single laser cavity oscillating at multiple wavelengths (frequencies) simultaneously thus providing a CW comb response. However, the construction of such device requires the combination of stabilized cavities and spectrally equalized gain response; the tolerances placed on both are severe since each comb frequency competes for the available gain, defining the total amplitude stability (jitter) of the system.

A widely used class of comb sources is based on mode-locked (ML) laser design. Frequency characteristics of the comb are precisely defined by the cavity properties, and, in the case of actively-locked ML lasers, by the modulation frequency. Unfortunately, this class of sources is fundamentally limited since: a) the source stability (amplitude/temporal jitter) is defined by the stability of the cavity, b) pulsed ML operation excludes CW or quasi-CW operating regime and c) ML is limited to generating frequencies on the equidistant grid; an arbitrarily defined frequency plan (such as progressively offset frequency comb) can not be generated.

Figure 20A:
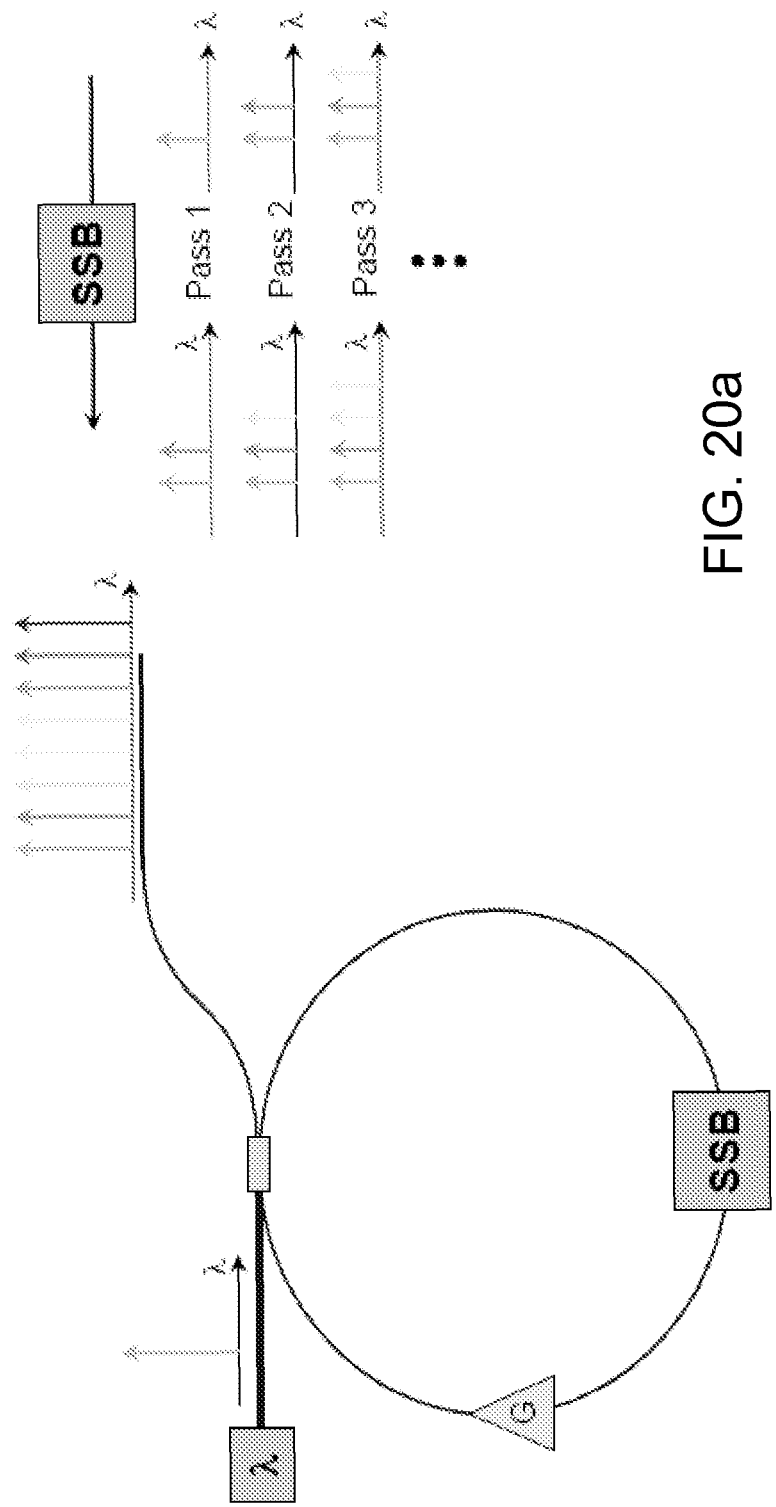
FIG. 20a illustrates conventional (frequency equidistant) comb generation using SSB device.

A different class of comb sources, illustrated in FIG. 20a, uses recirculating frequency-shifting element to generate set of stable frequencies. A single-sideband modulator (SSB) comb generator shifts the laser seed (λS) by precise, RF-defined frequency (Δf) during each pass within the fiber loop. The internal loop contains the gain element (G) which, in contrast to ML sources, does not enable lasing but loss-balancing only. The presence of this gain element is one of the main design concerns: 1) bandwidth of the system (comb spectral width) depends on the available amplifier bandwidth and 2) noise characteristic of the amplifier ultimately determines the carrier-to-noise ratio (CNR) of the generated comb. In addition to conventional (phase-insensitive) gain engineering, both issues can be dealt with by introducing the parametric (phase-sensitive) element within the fiber loop:

The amplifier bandwidth can be substantially wider than the gain bandwidth of the conventional (EDFA, Raman, SOA) amplifiers, typically limited to less than 60 nm;

Noise Figure (NF) of the parametric gain block can, in principle, be considerably lower than that of phase-insensitive amplifier by operating the system in phase-locked regime.

Figure 20B:
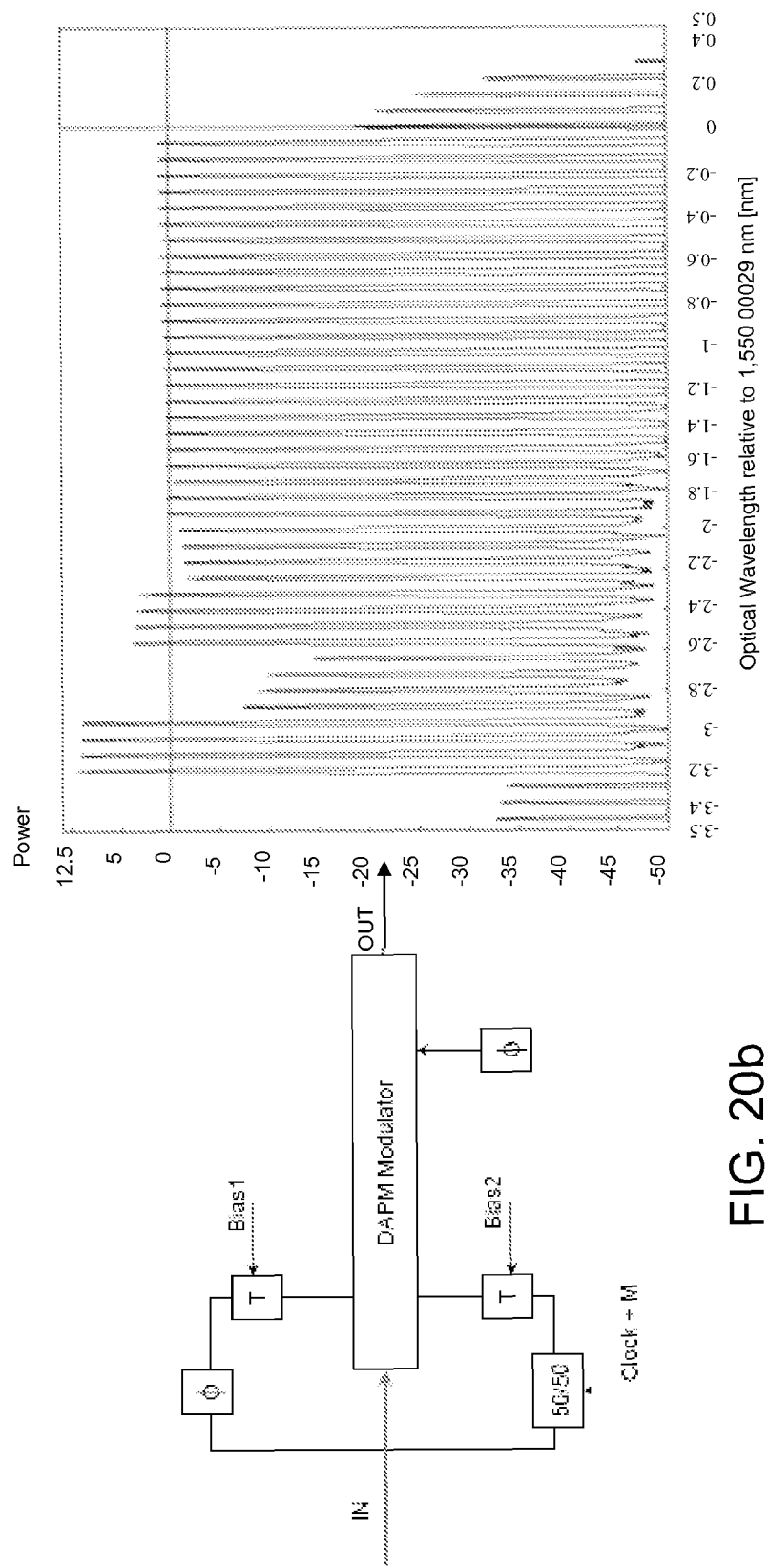
FIG. 20b shows SSB modulation generated using a dual amplitude/phase modulator.

FIG. 20b shows the simulated, near-equalized output formed after 40-loop passes with SSB modulation generated using a dual amplitude/phase modulator by selecting the phase shift π/2 and the bias level Vπ/2.

Figure 21:
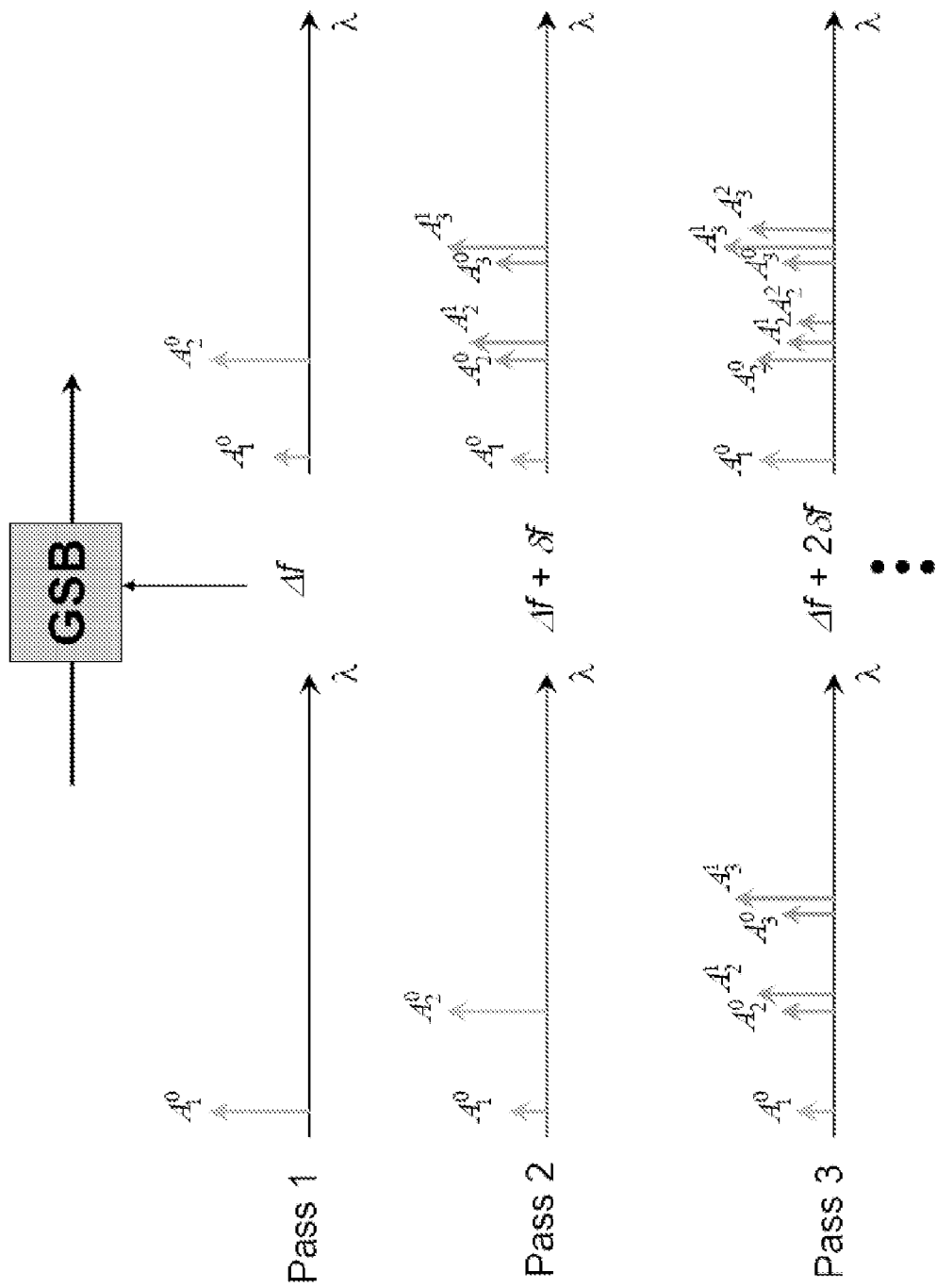
FIG. 21 is a diagram illustrating how the generalized sideband concept combines bias, modulation depth and frequency controls to generate engineered multiple-harmonic outputs.

In contrast to conventional techniques, SSB based architecture offers the ability to generate frequency-labeled comb. FIG. 21 illustrates this concept by considering a generalized sideband modulation (GSM). During the first loop pass input signal (λS) experiences the combination of frequency shift Δf, and specific bias and modulation depth voltages, as illustrated in FIG. 21. During the second loop pass, the GSB modulator is driven by a different harmonic frequency, bias and modulation depth settings. As a simple example, the original (first-pass) harmonic tone is perturbed (shifted) by small frequency offset δf; i.e. the second-pass frequency becomes $f_C+\delta f$. The amplitude weights of the newly generated tones are controlled by combination of second-pass bias, phase shift and the strength of the frequency perturbation. The iterative process describing the stationary output state after many loop passes begins with first-pass generation by harmonically driven modulator at frequency Δf:

$$A_1^0 \rightarrow \alpha_1 A_1^0 + A_2^0, \quad (5)$$

where the original tone ($A_1^0$) is attenuated ($\alpha_1$) transferring the energy to newly formed tone ($A_2^0$). Two tones are subsequently amplified within the gain block G and attenuated before entering the modulator for the second time:

$$T(0)\alpha_1 A_1^0 + T(1)A_2^0 \rightarrow T(0)\alpha_2 A_1^0 + T(1)\beta_2 A_2^0 + A_3^0 + A_3^1 \quad (6)$$

The process continues until the entire gain bandwidth of the amplifier block is filled, i.e., the stationary GSM regime is reached.

Figure 22:
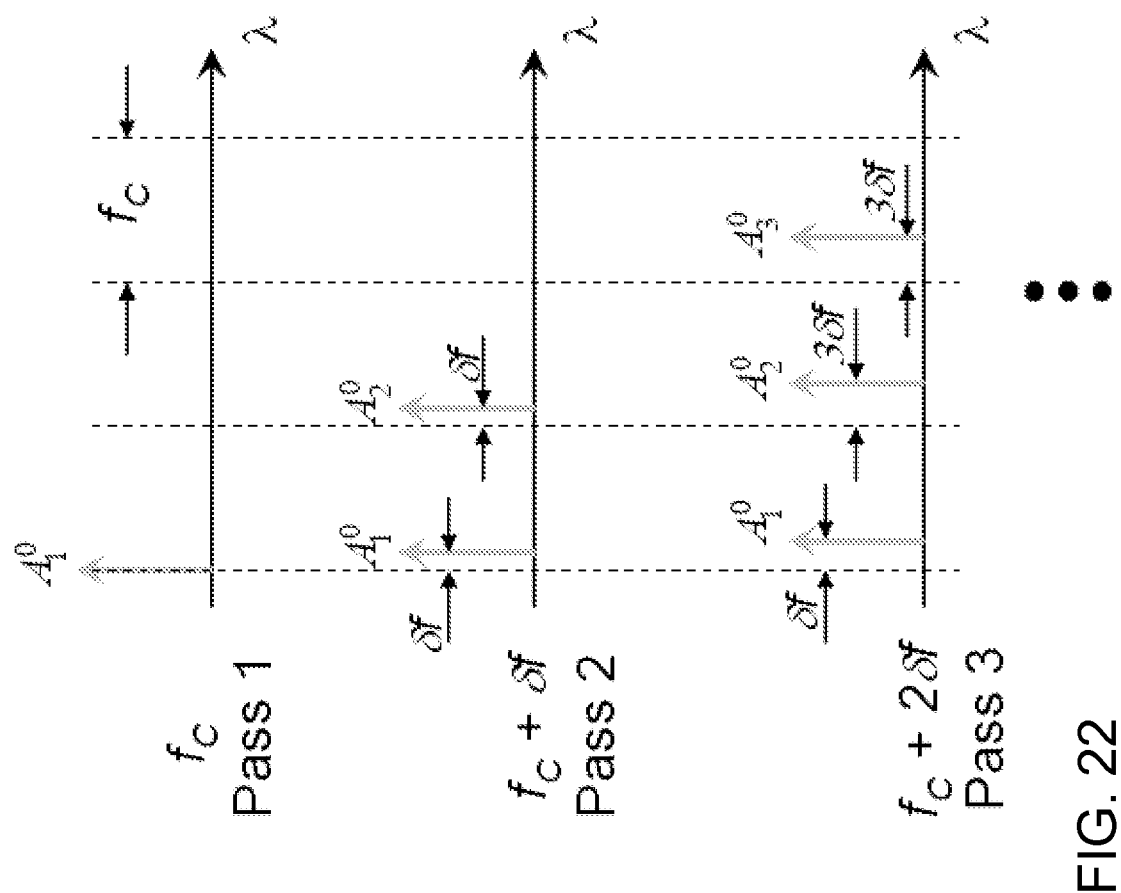
FIG. 22 is a diagram showing generalized sideband modulation operated in frequency control mode.

While GSM concept can be used to construct a great variety of frequency responses, a special case that results in amplitude-equalized, frequency-unequidistant generation is of special interest. To describe this source, we assume that GSM is operated in SSB mode during each loop pass; the modulator frequency is changed discretely and is precisely synchronized to the loop flight time. The generator frequency ($f_C$) is increased by δf after each loop, defining the modulator frequency to be $f_C+N\delta f$ after N passes. The comb generation is initiated by the input state $A_1^0$ that produces a progressively offset set of harmonics, as shown in FIG. 22.

Precise SSB condition and gain block balance can be used to guarantee nearly equalized generation of all generated harmonics. The frequency of the M-th harmonic after N loop passes can be derived as:

$$M \times f_c + \left[(N-M)(M+1) + \sum_{s=1}^{M} k\right] \times \delta f \quad (7)$$

The table in FIG. 23 can be used to visualize the generation of the new harmonics as a function of offset from the equidistant frequency grid.

Figure 24:
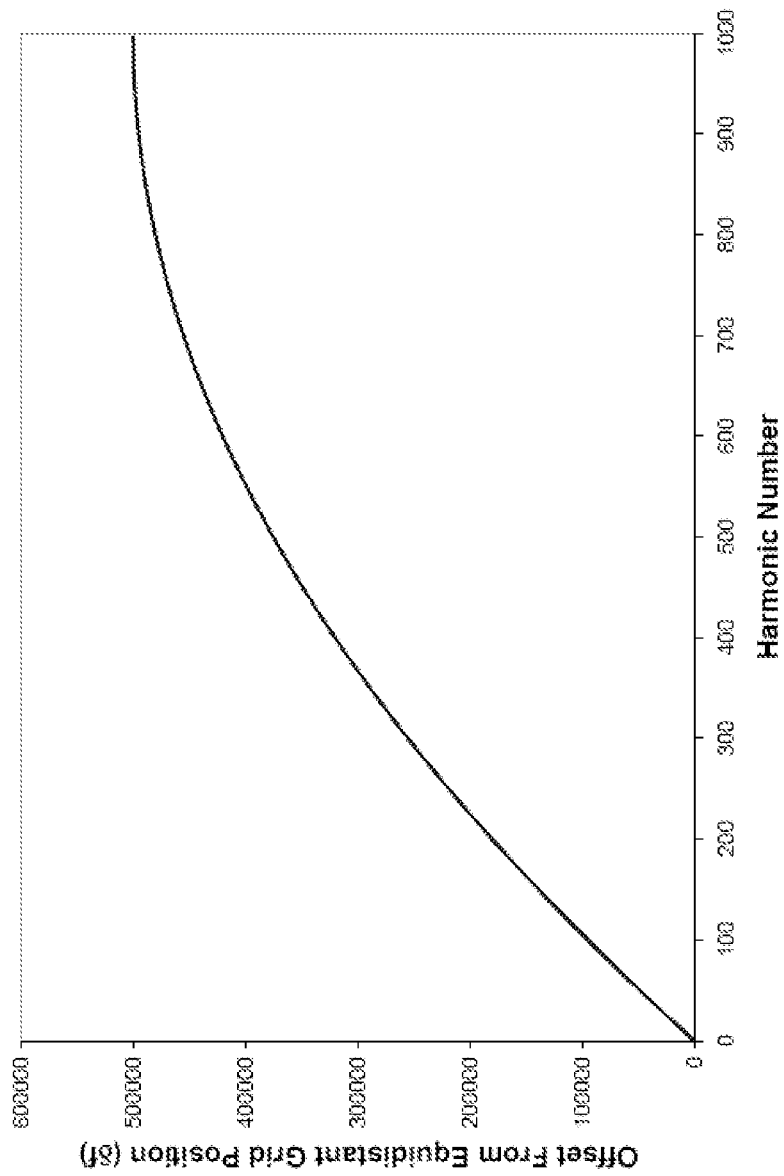
FIG. 24 is a plot of the offset from equidistant frequency grid after 1000 loop passes in terms of loop frequency perturbation ($\delta f$).

As a specific example, consider the comb generated with $f_C$=10 GHz and incremental frequency deviation of δf=1 kHz. A frequency equidistant comb providing comparable spectral density (~0.1 nm) and spectral span of 100 nm requires nearly 1000 harmonics. A frequency unequidistant comb spanning the same spectral range would deviate from the equidistant 10 GHz frequency grid in strict correspondence with Equation 7. After 1000 loop passes, the first harmonic (M=0) would have a frequency of 1000δf, while the 500$^{th}$ harmonic (M=500) will have a frequency deviating by 375750δf from the corresponding equidistant grid frequency. Similarly, the 1000$^{th}$ harmonic (M=1000) will deviate by ~500000δf from corresponding equidistant grid frequency (1000*10 GHz). In other words, for a chosen δf=1 kHz, the first harmonic would be positioned at 0.0001 GHz away from the original (seed) carrier frequency, while the 1000$^{th}$ harmonic will be positioned 500 MHz away from the equidistant grid frequency, i.e. f1000=1000*10 GHz+500 MHz. The exact choice of grid spacing (fC) and incremental deviation depends on: a) specific application and b) constraints that system puts on physical size, power and available gain performance. More importantly, the example illustrated here addresses only the simplest, digital change in SSB frequency (the carrier frequency changes discretely during the each loop pass). A more complex, and indeed practical, approach would use continuous frequency perturbation that can be mapped to desired comb response. FIG. 24 illustrates the frequency deviation from the carrier modulation fC with increasing harmonic number after a large (1000) number of loop passes.

Considering the simplest, digitally formed unequidistant comb received by slow square-law detector, we further assume that the response of the detector does not exceed ½ fC and that the detector spectral response is sufficient for reception of all generated harmonics. If the comb were to be formed from the equidistant harmonics (fC apart), one would receive a DC contribution only—the beating between adjacent (or any other) harmonics would simply fall outside the detector spectral range. However, a frequency unequidistant comb described here would generate qualitatively different detector response. According to the deviation table (FIG. 22) or Equation 7, the adjacent harmonics would be positioned (with respect to the original seed laser frequency) at:

$0f_C + N\delta f$ $1f_C + (2N-1)\delta f$ $2f_C + (3N-3)\delta f$ $3f_C + (4N-6)\delta f$ $\vdots,$ where N is the total number of the loop passes. The adjacent harmonics would beat at a following set of frequencies: $f_C+(N-1)\delta f$, $f_C+(N-2)\delta f$, $f_C+(N-3)\delta f$, .... The higher set of beat frequencies, formed by non-adjacent harmonics beating is omitted. Since all harmonics are formed around $f_C$ (modulation carrier), the detector would need to have at least a narrow frequency response around that frequency (say $f_C+/-\Delta f$, where $\Delta f < f_C/2$). This approach would take the advantage that a fast (e.g., 10 GHz) detector does not need to be engineered from DC to more than 10 GHz, but around the modulation carrier only (say 10 GHz+/−1 GHz). A set of beat harmonics formed around 10 GHz would then be translated to a baseband (in RF domain), thus allowing for a slow real time processing (<1 GHz in this example). An alternative approach would be to mix the frequency unequidistant comb and frequency equidistant comb in order to produce the baseband set of harmonics by using a slow detector in the first place. Another approach would mix the unequidistant combs generated at nearly (but not identical) number of passes (e.g., N1 and N2) in order to allow for slow detector use.

Cavity reconfiguration speed is recognized as a limiting process in all tunable lasers, which cannot be circumvented by any conventional approach. The present invention applies a non-conventional scheme, using extra-cavity means for increasing tunable laser performance. The parametric process provides physical means for decoupling the wavelength tuning from the cavity reconfiguration mechanism. While confined by conservation of energy and momentum of interacting photons, that cavitless source tuning (CAST) mechanism is independent of cavity lifetime and is inherently limited only by the nonlinear response time of the mixer. In an analogy to a mechanical gear box, the CAST mechanism can be seen as an equivalent of true optical frequency scaler, as it allows the tuning range and the tuning (sweep) range to be multiplied, independent of the input laser source properties.

The present invention can provide substantial improvement to a number of applications that rely on tunable optical sources. Examples of a few areas that can benefit from increased optical source response include biomedical diagnostics such as optical coherence tomography (OCT), medical treatments such as laser ablation, spectroscopy, where the invention can provide orders of magnitude higher resolution and speed, communications, to facilitate spectrally agile and encrypted transmissions, displays, providing rapid scanning and arbitrary color displays, laser cooling, laser isotope separation, and interferometry.

The invention claimed is:

1. A method for tuning an optical source, comprising:
    inputting a first pump signal having a first pump frequency into a mixer;
    inputting a first seed signal having a first seed frequency into the mixer;
    generating at least one idler having an idler frequency defined as two times the pump frequency minus the seed frequency;
    shifting the pump signal across a frequency range at a sweep rate whereby the idler frequency is shifted by two times the frequency range at two times the sweep rate; and
    mixing the shifted at least one idler with the shifted pump signal to generate at a mixer output a first mix product having two times the sweep rate and frequency range of the pump signal.

2. The method of claim 1, further comprising inputting the first mix product into a second mixer stage having a second seed signal, whereby a second mix product of the second mixer stage has a sweep rate and a frequency range that are doubled relative to the first mix product.

3. The method of claim 2, further comprising inputting the second mix product into n additional stages, whereby an $n^{th}$ mix product is generated having a sweep rate and a frequency range that are scaled up to (n+1) times the pump signal.

4. The method of claim 1, wherein the pump signal has a pump power having a level adapted to cause the at least one idler to act as a secondary pump source, whereby the first mix product is scaled up to three times the sweep rate and frequency range of the pump signal.

5. The method of claim 1, further comprising disposing a mirror at the mixer output, wherein the mirror is adapted to return the seed and at least one idler to produce a further enhanced output tuned over four times the sweep rate and frequency range of the pump signal.

6. The method of claim 1, further comprising connecting a second mixer stage to the mixer output to receive the first mix product and a mirror disposed at the output of the second mixer stage, whereby the mix product of the second mixer stage is sixteen times the sweep rate and frequency range of the pump signal.

7. The method of claim 1, further comprising, prior to inputting the pump signal into the mixer, amplifying the pump signal.

8. The method of claim 1, further comprising, prior to inputting the seed signal into the mixer, amplifying the seed signal.

9. The method of claim 1, further comprising, prior to inputting each of the seed signal and the pump signal into the mixer, aligning states of polarizations of the pump and the seed signals.

10. The method of claim 1, further comprising, prior to inputting the seed signal into the mixer, phase dithering the seed signal with an RF noise source.

11. The method of claim 1, wherein the mixer comprises a highly nonlinear fiber.

12. The method of claim 11, wherein the highly nonlinear fiber is dispersion flattened.

13. The method of claim 1, further comprising inputting a second pump signal having a second pump frequency into the mixer, whereby three new idlers having three different idler frequencies are generated and the seed frequency shift is quadrupled.

14. A method of upscaling a sweep rate and frequency range of an optical source, comprising:
    within a first mixer, using four-photon mixing to generate at least one idler from a combination of a first pump signal from the optical source having a pump frequency and a pump sweep rate and a seed signal, wherein the at least one idler has an idler frequency range and idler sweep rate that is twice the pump frequency range and pump sweep rate;
    mixing the at least one idler with the pump signal to generate a first mix product at an output, the first mix product having a sweep rate and frequency range that is at least twice that of the pump signal.

15. The method of claim 14, further comprising cascading at least one additional mixer with the first mixer, wherein the sweep rate and the frequency range of the mix product of the at least one additional mixer are upscaled by a factor of two relative to the first mix product.

16. The method of claim 14, further comprising inputting a second pump signal having a second pump frequency into the first mixer, whereby three new idlers having three different idler frequencies are generated and the first mix product has a sweep rate and frequency range that is four times that of the pump signal.

17. The method of claim 14, further comprising inputting the first mix product into a second mixer stage having a second seed signal, whereby a second mix product of the second mixer stage has a sweep rate and a frequency range that is doubled relative to the first mix product.

18. The method of claim 17, further comprising inputting the second mix product into n additional stages, whereby an $n^{th}$ mix product is generated having a sweep rate and a frequency range that are scaled up to (n+1) times the pump signal.

19. The method of claim 14, wherein the pump signal has a pump power having a level adapted to cause the at least one idler to act as a secondary pump source, whereby the first mix product is scaled up to three times the sweep rate and frequency range of the pump signal.

20. The method of claim 14, further comprising disposing a mirror at the mixer output, wherein the mirror is adapted to return the seed and at least one idler to produce a further enhanced output tuned over four times the sweep rate and frequency range of the pump signal.

21. The method of claim 14, further comprising connecting a second mixer stage to the mixer output to receive the first mix product, and disposing a mirror at the output of the second mixer stage, whereby the mix product of the second mixer stage is sixteen times the sweep rate and frequency range of the pump signal.

22. The method of claim 14, further comprising, prior to inputting the pump signal into the mixer, amplifying the pump signal.

23. The method of claim 14, further comprising, prior to inputting the seed signal into the mixer, amplifying the seed signal.

24. The method of claim 14, further comprising, prior to inputting each of the seed signal and the pump signal into the mixer, aligning states of polarizations of the pump and the seed signals.

25. The method of claim 14, further comprising, prior to inputting the seed signal into the mixer, phase dithering the seed signal with an RF noise source.

26. The method of claim 14, wherein the mixer comprises a highly nonlinear fiber.

27. The method of claim 26, wherein the highly nonlinear fiber is dispersion flattened.

28. A fast, continuously tunable optical source, comprising:
a mixer having an input and an output;
a first pump adapted for generating a pump signal at a first pump frequency and for sweeping the frequency across a first frequency range;
a first seed source for generating a first seed signal having a first seed frequency;
a combiner for combining the first pump signal and the first seed signal and inputting the combined signals into the mixer;
wherein the first pump signal and the first seed signal are mixed within the mixer to generate at least one idler having an idler frequency defined as two times the pump frequency minus the seed frequency, and wherein the at least one idler mixes with the pump signal to generate a first mix product at the output, the first mix product having two times the sweep rate and frequency range of the pump signal.

29. The optical source of claim 28, further comprising a second mixer stage in communication with the output of the mixer for receiving the first mix product, the second mixer stage having a second seed signal and a second output, wherein a second mix product is generated at the second output the second mix product having a sweep rate and a frequency range that is doubled relative to the first mix product.

30. The optical source of claim 29, further comprising n additional stages in communication with the second output for receiving the second mix product, whereby an $n^{th}$ mix product is generated having a sweep rate and a frequency range that are scaled up to (n+1) times the pump signal.

31. The optical source of claim 28, wherein the pump signal has a pump power having a level adapted to cause the at least one idler to act as a secondary pump source, whereby the first mix product is scaled up to three times the sweep rate and frequency range of the pump signal.

32. The optical source of claim 28, further comprising a mirror disposed at the output, wherein the mirror is adapted to return the seed and at least one idler to produce a further enhanced output tuned over four times the sweep rate and frequency range of the pump signal.

33. The optical source of claim 28, further comprising a second mixer stage connected to the output to receive the first mix product and a mirror disposed at the output of the second mixer stage, whereby the mix product of the second mixer stage is sixteen times the sweep rate and frequency range of the pump signal.

34. The optical source of claim 28, further comprising an amplifier disposed between the first pump and the mixer for amplifying the first pump signal.

35. The optical source of claim 28, further comprising an amplifier disposed between the first seed source and the mixer for amplifying the first seed signal.

36. The optical source of claim 28, further comprising a polarization controller disposed between each of the first pump and the first seed source and the mixer for aligning states of polarizations of the pump and the seed signals.

37. The optical source of claim 28, further comprising an RF noise source and a phase modulator for phase dithering the seed signal with RF noise prior to inputting the seed signal into the mixer.

38. The optical source of claim 28, wherein the mixer comprises a highly nonlinear fiber.

39. The optical source of claim 38, wherein the highly nonlinear fiber is dispersion flattened.

40. The optical source of claim 28, further comprising a second pump for inputting a second pump signal having a second pump frequency into the mixer, whereby three new idlers having three different idler frequencies are generated and the seed frequency shift is quadrupled.

41. An optical source, comprising:
a pump source emitting a pump signal at a pump frequency;
a seed source emitting a seed signal at a seed frequency;
a mixer for receiving the pump signal and the seed signal, wherein four-photon mixing produces at least one idler that mixes with the pump signal to produce a mix product having an upscaled sweep and frequency range relative to that of the pump signal.

42. The optical source of claim 41, wherein the mix product has a sweep and frequency range that are upscaled by a factor of two or more relative to that of the pump signal.

43. The optical source of claim 41, further comprising a second mixer for generating a second mix product having a sweep and frequency range this are upscaled by a factor of four or more relative to that of the pump signal.

44. The optical source of claim 41, further comprising a second pump for generating a plurality of idlers that mix with the pump signal to product a mix product having a sweep and frequency range that are upscaled by a factor of three or more relative to that of the pump signal.

\* \* \* \* \*